(12) United States Patent
Lees

(10) Patent No.: US 11,136,856 B2
(45) Date of Patent: Oct. 5, 2021

(54) WELL APPARATUS AND ASSOCIATED METHODS

(71) Applicant: Resolute Energy Solutions Limited, Stonehaven (GB)

(72) Inventor: Iain Lees, Stonehaven (GB)

(73) Assignee: Resolute Energy Solutions Limited, Stonehaven (GB)

(*) Notice: Subject to any disclaimer, the term of this patent is extended or adjusted under 35 U.S.C. 154(b) by 0 days.

(21) Appl. No.: 16/336,030

(22) PCT Filed: Sep. 21, 2017

(86) PCT No.: PCT/GB2017/052824
§ 371 (c)(1),
(2) Date: Mar. 22, 2019

(87) PCT Pub. No.: WO2018/055382
PCT Pub. Date: Mar. 29, 2018

(65) Prior Publication Data
US 2019/0383115 A1    Dec. 19, 2019

(30) Foreign Application Priority Data

Sep. 22, 2016 (GB) .................................... 1616152

(51) Int. Cl.
*E21B 33/138* (2006.01)
*C09K 8/50* (2006.01)
*C09K 8/42* (2006.01)

(52) U.S. Cl.
CPC ............ *E21B 33/138* (2013.01); *C09K 8/424* (2013.01); *C09K 8/426* (2013.01); *C09K 8/50* (2013.01)

(58) Field of Classification Search
None
See application file for complete search history.

(56) References Cited

U.S. PATENT DOCUMENTS

| 5,512,096 A | 4/1996 | Krause |
| 5,657,822 A * | 8/1997 | James ................... E21B 27/02 166/180 |
| 6,715,543 B1 * | 4/2004 | Svindland .............. E21B 33/02 166/192 |

(Continued)

FOREIGN PATENT DOCUMENTS

| WO | 96/37682 | 11/1996 |
| WO | 2015/094322 | 6/2015 |

OTHER PUBLICATIONS

Examination Report dated Mar. 4, 2019 in corresponding GB Patent Application No. GB1616152.3.

(Continued)

*Primary Examiner* — Charles R Nold
(74) *Attorney, Agent, or Firm* — Hogan Lovells US LLP

(57) ABSTRACT

A method of sealing in a bore, such as plugging a well for abandonment. The method includes applying a swellable in particulate form to the bore. The swellable includes a polymer. The particulate swellable is positioned in place within the bore at a desired location. The method includes swelling the swellable so as to form a seal at the desired location. The technology may also include a well comprising a bore with a seal applied by injecting the swellable in particulate form as a flowable into the bore.

19 Claims, 16 Drawing Sheets

(56) References Cited

U.S. PATENT DOCUMENTS

| | | | |
|---|---|---|---|
| 7,409,990 B1* | 8/2008 | Burts, Jr. | C04B 40/0666 |
| | | | 166/285 |
| 2005/0096330 A1* | 5/2005 | Boettcher | A61P 1/00 |
| | | | 514/254.09 |
| 2006/0243166 A1 | 11/2006 | Matula | |
| 2010/0186956 A1 | 7/2010 | Morgan | |
| 2010/0258312 A1* | 10/2010 | Brenneis | C04B 28/021 |
| | | | 166/293 |
| 2011/0237468 A1 | 9/2011 | Reichenbach-Klinke | |
| 2012/0328377 A1 | 12/2012 | Brenneis | |
| 2013/0092401 A1 | 4/2013 | Freyer | |
| 2013/0161006 A1 | 6/2013 | Robisson | |
| 2015/0034311 A1* | 2/2015 | Tunget | E21B 47/005 |
| | | | 166/250.14 |
| 2016/0002998 A1 | 1/2016 | Wang | |
| 2018/0163121 A1* | 6/2018 | Agapiou | C04B 22/0093 |

OTHER PUBLICATIONS

Examination Report dated Mar. 1, 2019 in corresponding UK Patent Application No. GB1616152.3.
UKIPO Search Report dated Nov. 11, 2016 in corresponding UK Patent Application No. GB1616152.3.
Examination Report dated Jun. 4, 2019 in corresponding UK Patent Application No. GB1616152.3.

* cited by examiner

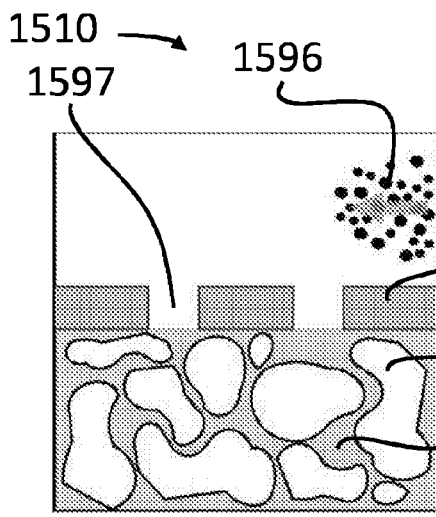
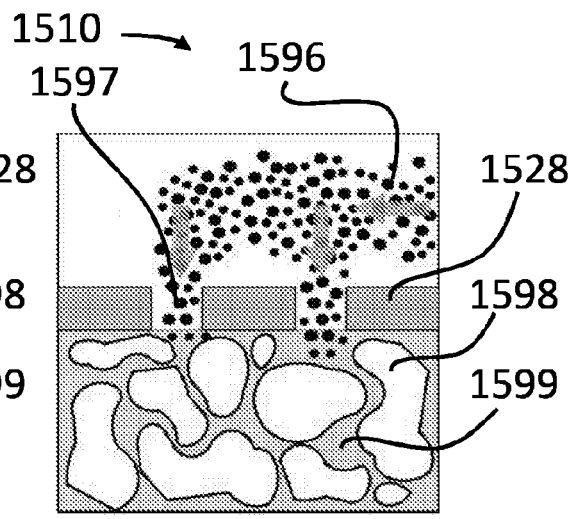
Fig. 26a
Fig. 26b
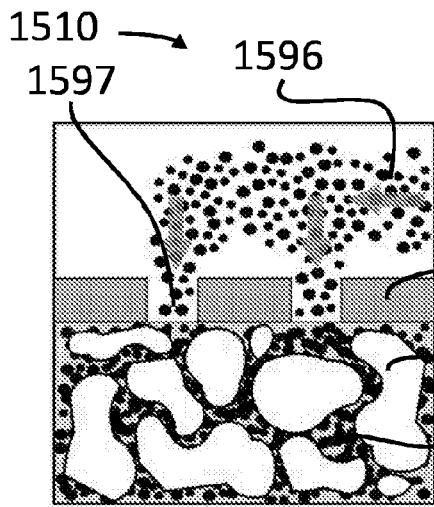
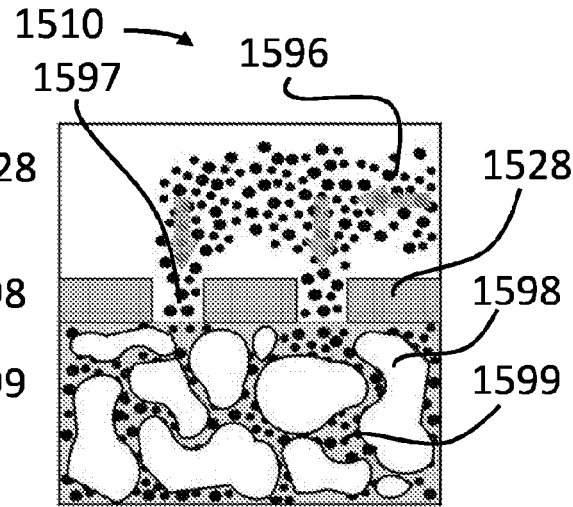
Fig. 26c
Fig. 26d
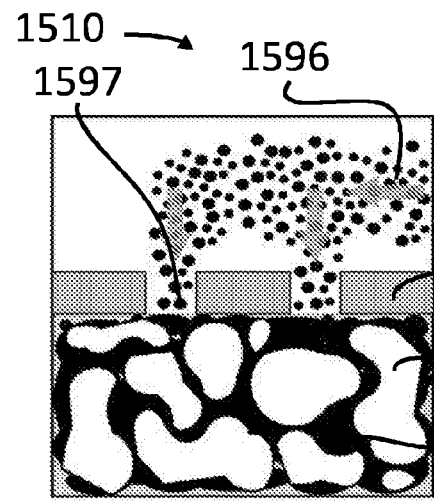
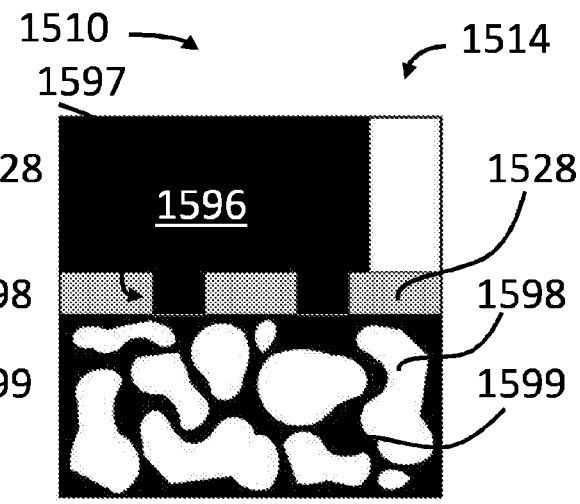
Fig. 26e
Fig. 26f

WELL APPARATUS AND ASSOCIATED METHODS

CROSS REFERENCE TO RELATED APPLICATIONS

This application is a 35 U.S.C. 371 National Stage of International Application No. PCT/GB2017/052824, titled "WELL APPARATUS AND ASSOCIATED METHODS", filed Sep. 21, 2017, which claims priority to GB Application No. 1616152.3, titled "WELL APPARATUS AND ASSOCIATED METHODS", filed Sep. 22, 2016, all of which are incorporated by reference herein in their entirety.

TECHNICAL FIELD

This disclosure concerns wells, well apparatus and associated methods. For example, the disclosure concerns well apparatus and associated methods for sealing in a well. In particular, but not exclusively, examples of the disclosure concern methods of sealingly plugging a well, such as for abandonment.

BACKGROUND

Drilled bores, such as for accessing subterranean hydrocarbon reserves, are often cased or lined to assist in the transport of fluids through the bores. Viable bores are typically lined or cased with tubular steel members, such as casing and/or liners, which is often cemented in place.

Particularly after production from the bore has been completed, or where the bore has become no longer viable, the bore may be plugged and abandoned. The plugging and abandonment of bores is generally performed to mitigate against the unintended transport of fluid through the bore. For example, where the bore has accessed a pressurised subterranean hydrocarbon reserve, the redundant post-production bore is plugged and abandoned to prevent an undesired release of oil or gas into the surrounding environment, such as an adjacent seabed.

The subject matter of at least some examples of the present disclosure may be directed to overcoming, or at least reducing the effects of, one or more of the problems of the prior art, such as may be described above.

SUMMARY

According to a first aspect there is provided a method of sealing in a bore.

The method may comprise applying a swellable to the bore. The swellable may comprise a polymer. The swellable may comprise a polymer-based swellable. The swellable may comprise a swellable polymer. The method may comprise applying the swellable as a flowable into the bore. Applying the swellable may comprise injecting the swellable in a flow into the bore. In at least some examples the flow may comprise a carrier for the swellable, such as a carrier fluid or liquid. The swellable may be fluidized, at least for injection into the bore. The swellable may be fluid-borne, at least for injection into the bore. The method may comprise pumping the swellable into the bore. The method may comprise flowing the swellable into the bore. The method may comprise applying the swellable from an uphole location, such as from a wellhead and/or surface location.

The method may comprise applying the swellable as a plurality of elements. The method may comprise applying the swellable to the bore in a non-annular form. The method may comprise applying the swellable to the bore in an indefinite form. The swellable may comprise an indefinite form prior to application. The indefinite form may comprise a pourable form. The swellable may comprise a non-preformed swellable prior to application. The method may comprise applying the swellable to the bore in particulate form. The particulate form may comprise one or more of: granules, pellets, powder/s; and/or fiber/s. The particulate form may comprise an indeterminate or non-defined arrangement or relationship between the particles of the swellable, at least prior to application. The method may comprise not pre-forming the swellable prior to insertion into the bore. The method may comprise entraining the swellable, such as for fluidized injection.

The method may comprise applying the swellable in a mixture. The method may comprise applying the swellable in a carrier, such as a carrier fluid. In at least some examples, the carrier may comprise an inert fluid. The carrier may comprise an activating fluid. Additionally, or alternatively, the carrier may comprise a spacer. Additionally, or alternatively, the carrier may comprise a settable fluid. For instance, in at least some examples, the carrier may contain: an activating fluid, such as an activating oil; a spacer, such as a filler fiber, aggregate, clay or the like; and a settable fluid, such as a resin, clay or the like.

Additionally, or alternatively, the carrier may comprise a hardening material. The hardening material may comprise a settable cement. In at least some examples, the method may comprise injecting the swellable as part of a cementing operation. Injecting the swellable as part of the cementing operation may comprise injecting the cement and the swellable simultaneously, such as a cement/swellable mixture. In other examples, the swellable may be injected non-simultaneously as part of a cementing operation, such as sequentially or alternately with the cement.

The swellable may be selected from one or more of: a synthetic swellable; a polymer swellable; a polymer-based swellable; a water-swellable swellable; an oil-swellable; a hydrocarbon oil swellable; a swellable activatable by a non-water-based fluid; a swellable activatable by a non-oil-based fluid; an elastomer; a rubber. In at least some examples, the swellable may comprise all of said aforementioned properties or features. In such examples, the swellable may comprise an oil- and water-swellable synthetic elastomeric rubber polymer. In at least some other examples, the swellable may comprise only a limited number of said aforementioned properties or features. For example, in such other examples, the swellable may comprise a water-swellable synthetic elastomeric rubber polymer that is not oil-swellable. In yet other examples, the swellable may comprise an oil-swellable synthetic elastomeric rubber polymer. In at least some examples, the swellable may comprise a swellable in a matrix for application, such as a swellable polymer gel composition for application.

The method may comprise applying the swellable such as to form a seal to prevent a flow of fluid/s longitudinally along the bore. The method may comprise applying the swellable such as to form a swellable seal along a longitudinal section or length of the bore. The swellable seal may comprise a length of at least 10 metres. In at least some examples, the swellable seal may comprise a length of at least 5 metres. In at least some examples, the swellable seal may comprise a length of at least 1 metre. In at least some examples, the swellable seal may comprise a length of at least 50 metres. In at least some examples, the swellable seal may comprise a length of at least 100 metres. In at least some examples, the swellable seal may comprise a length of at least 200 metres. Preventing a flow of fluid/s along the bore may comprise preventing a flow of fluids out of and/or into the bore, such as axially out of and/or axially into the bore.

The longitudinal length of the swellable seal along the bore may be determined by an amount of swellable injected into the bore, such as a volume of swellable injected into the bore. The geometric form of the swellable prior to application may be determined or defined by a container for the swellable prior to application. The method may comprise determining a volume of swellable to be applied. Determining the volume of swellable to be applied may comprise calculating a desired seal volume within the bore. The desired seal volume may be determined according to a desired seal length along the bore, such as in combination with a cross-section/s of the bore along said desired length of seal.

In at least some examples, the seal may prevent or assist in preventing the flow of fluids laterally into and/or out of the bore.

The method may comprise applying the swellable as a layer or zone within the bore. The layer or zone may comprise an axial layer or zone. The method may comprise applying a plurality of layers or zones of swellable. The plurality of layers or zones of swellable may comprise swellables of different properties. For example, a first layer or zone may comprise a first type of swellable; and a second layer or zone may comprise a second type of swellable, the second type of swellable being different from the first type of swellable. Additionally, or alternatively, in at least some example methods, a plurality of layers or zones of the same type of swellable is applied. For example, distinct layers or zones of swellable may be applied, such as sequentially. The plurality of layers or zones of swellable may be separated by an intermediate layer/s or zone/s, such as separated by spacers, cement or other types of material (e.g. other types of sealing material, such as another type of swellable). The method may comprise sandwiching one or more layers or zones. For example, the method may comprise applying alternate layers of swellable and cement; and/or of two different types of swellable. Each layer or zone may comprise a particular axial length. The/each layer or zone may comprise a length of at least 10 metres. In at least some examples, the/each layer or zone may comprise a length of at least 5 metres. In at least some examples, the/each layer or zone may comprise a length of at least 1 metre. In at least some examples, the/each layer or zone may comprise a length of at least 50 metres. In at least some examples, the/each layer or zone may comprise a length of at least 100 metres. In at least some examples, the/each layer or zone may comprise a length of at least 200 metres.

In at least some examples, the applied swellable may comprise a mixture of types of swellable. For instance, the swellable may comprise a plurality of different types of particulate swellable such as oil-swellable particles mixed with water-swellable particles.

The method may comprise determining or predetermining the plurality of axial layers or zones of swellable/s and/or additional layers or zones. The method may comprise determining or predetermining the application of the swellable, such as according to a simulation and/or computer model of the well.

The method may comprise providing the swellable in or within a container for injection into the bore. The container may comprise an outlet for flowing or pumping the swellable out of the container into the bore. The shape of the swellable prior to injection into the bore may be different to that of the swellable seal. For example, where the swellable seal comprises a circular, a ring or annular shape, the swellable may comprise a non-circular or non-ring/non-annular shape prior to injection (e.g. not comprising a cross-section corresponding to a cross-section or portional cross-section of the bore). The swellable may comprise an indefinite or undefined shape prior to application, such as prior to insertion into the bore. In at least some examples, the swellable comprises an injectable or pumpable form prior to application, such as a swellable comprised of multiple discrete particles, elements, granules, pellets, fiber/s and/or powder.

The method may comprise sealing within the bore. The method may comprise sealing-in the bore, such as to prevent passage of fluid/s into and/or out of the bore. The method may comprise plugging the bore. The swellable may comprise a swellable plug, at least after or upon completion of the sealing with the swellable. The swellable may comprise a swollen swellable, at least after or upon completion of the sealing with the swellable. For example, the method may comprise at least partially swelling the swellable such as to form the seal. In at least some examples, the method may comprise only partially swelling the swellable to form the seal. In such examples, the seal formed by the swellable may comprise a swellable that is capable of subsequent swelling after an initial seal is formed. The seal may comprise an adaptive seal, such as capable of adapting to changes such as environmental or conditional changes over time. For example, the seal may be configured to swell in the presence of oil and/or water so as to re-seal or increase sealing in a subsequent presence of oil and/or water, such as may be associated with changes in the bore subsequent to sealing. By way of example, where downhole pressure changes, such as in a reservoir associated with the bore, establish a fluid path; or where cracks or changes in an associated formation or section of sealed bore, the seal may adapt to re-seal such as by swelling (e.g. to fill the crack/s/block the fluid path). The method may comprise abandoning the bore. The swellable may comprise an abandonment swellable, at least after or upon completion of the sealing with the swellable.

The method may comprise applying the swellable after the completion of the bore. The method may comprise applying the swellable after production, or after termination of production, from the bore. In at least some examples, the method may comprise applying the swellable before completion of the bore, such as to seal, and optionally abandon, a partial bore. The method may comprise applying the swellable to one or more of: a blind bore; a test bore; a production bore; a sidebranch bore; a deviated bore; a main bore; an abandoned bore; an exploration bore; a collapsed bore; a damaged bore.

The method may comprise applying the swellable as part of an initial step of sealing, such as for abandonment.

In at least some examples, the method may comprise a further step of sealing, such as for abandonment. The further step may comprise a cementing operation. In at least some examples, the method may comprise the cementing operation as a supplementary or complementary step subsequent to the injection of the swellable. The method may comprise performing the cementing operation after a sealing operation with the swellable. The method may comprise performing the cementing operation after the swellable has: swelled/swollen; set; cured; and/or sealed. In at least some examples, the cementing operation may be performed before the swellable has swollen or fully swollen. In such examples, the cementing operation may be performed concurrently with the application of the swellable; or at least simultaneously with the establishment of the swellable seal. At least a portion of a potential swellability or potential energy of the swellable seal may be preserved, such that the swellable may swell or swell further a considerable time period after establishment of the swellable seal, such as several days, months or years later. The potential energy of the swellable seal may retain residual energy to effect the seal; such as to transfer energy to pressurise fluid and/or exert force on adjacent material, such as cement, formation, casing, control line, or the like. In at least some examples, the energy of the swellable seal may maintain a position, such as of cement (e.g. in annular space, before and/or after setting of cement). The cementing operation may comprise an abandonment cementing operation. The method may comprise applying a cement section along a length of the bore uphole of the section or length along the bore previous sealed by the swellable in a preceding step. Accordingly, the method may comprise applying a swellable seal downhole of a section of cement. The uphole section of cement may assist in longitudinally fixing or restraining the swellable seal, such as with a weight of the cement. For example, the uphole cement section may reduce passage and/or swelling of the swellable uphole in or along the bore. The cement section may assist in constraining swelling of the swellable seal to lateral swelling, such as annular or radial swelling, such as to assist in forming a seal perpendicular to the longitudinal axis of the bore. Additionally or alternatively, the method may comprise applying the swellable uphole of a cement section or length. In at least some examples, the method may comprise applying a total combined volume of swellable and cement less than may otherwise be required for a purely cementing operation (e.g. the total sealing volume or bore length may be less than required in a cementing only sealing operation). In some examples, as an alternative or in addition to a subsequent cementing step, the swellable may be applied after the cementing step.

The method may comprise actively swelling the swellable such as to form the seal. The method may comprise actively swelling the swellable to seal with an activating fluid. The method may comprise actively swelling the swellable prior to the cementing operation. The method may comprise actively swelling the swellable by exposing the swellable to the activating fluid. The method may comprise actively swelling the swellable by introducing or injecting the activating fluid. The method may comprise actively swelling the swellable by opening a flowpath for the activating fluid. The method may comprise applying the activating fluid from uphole, such as from surface or a wellhead. Additionally or alternatively, the method may comprise applying the activating fluid from downhole, such as from the reservoir or adjacent formation. The method may comprise applying the activating fluid longitudinally to the swellable, such as from topside or an uphole end of the swellable section. In at least some examples, the cement, or cementing step, may comprise the activating fluid.

The method may comprise curing the swellable. The method may comprise swelling the swellable pre-curing and/or post-curing. In at least some examples, the method may comprise providing a swellable seal that is swellable post-curing such as to be swellable to be self-sealing (e.g. to fill cracks, microannuli, or voids after complete curing). The method may comprise the provision of swellable particles sized and proportioned so as to penetrate cracks and microannuli or other potential flowpaths for fluid, such as hydrocarbon fluid. The method may comprise the provision of particles with at least a portion with a radius respectively less than 10 mm; less than 5 mm; less than 2 mm; less than 1 mm; less than 0.1 mm; less than 0.01 mm. In at least some example methods, the swellable may comprise a diameter less respectively less than 10 mm; less than 5 mm; less than 2 mm; less than 1 mm; less than 0.1 mm; less than 0.01 mm (or doubles thereof). The diameter may comprise a nominal diameter; or a maximum diameter in different methods. The method may comprise providing a range of sizes of swellable. In at least some examples, the diameter may comprise a maximum dimension. In at least some other examples, the particle may comprise a dimension in addition to the diameter, such as a longitudinal fiber, whereby a fiber length may exceed the diameter.

The method may comprise penetrating into the formation with the swellable. The method may comprise applying the swellable into the formation, such as into formation/reservoir rock pore space. The method may comprise clogging potential leakpaths to/from the formation with suitably sized swellable particles, such as sufficiently small to penetrate into the formation pores, at least when unswollen. The method may comprise clogging potential leakpaths, such as formation pores, with a swellable comprising a range of particle sizes. In at least some examples, the method may comprise particles of the swellable penetrating into the formation, such as the formation pores, by swelling.

The method may comprise permanently sealing the bore, such as for abandonment. The method may comprise permanently sealing the bore with the swellable.

In at least some examples, the method may comprise irreversibly sealing the bore. In other examples, the method may comprise reversibly sealing the bore. Such other examples may comprise re-opening an abandoned well or section. For example, the seal may be broken such as by: mechanical removal; perforation or re-perforating; acid stimulation; creating permeable paths; fracturing; or combinations hereof, such as of mechanical drill-out and acid injection. In at least some examples, the swellable seal may be bypassed, such as by side-tracking, drilling through or drilling out.

The method may comprise a step with or prior to the application of the swellable so as to provide an advance seal. The advance seal may be for stemming flow and/or pressure, such as whilst the applied swellable forms the swellable seal. The advance seal may comprise a mechanical seal. The advance seal may comprise an instantaneous seal. The advance seal may comprise a permanent seal; or may comprise a temporary seal in other examples. The advance seal may be provided by a pre-formed seal, such as a plug run in on wireline, slickline, coiled tubing or the like. The advance seal may comprise a definite form. The definite form may comprise a deformable form, such as a resilient form or an expandable form. The advance seal may comprise a swellable component, such as a pre-formed swellable component (e.g. swellable annular ring or the like). The advance seal may comprise a mechanical plug and/or packer. The advance seal may be provided to prevent or at least restrict a flow of fluids in the bore whilst the swellable seal is applied and/or cures, sets and/or is fixed in place in the bore. In at least some examples the advance seal may be retrievable or retrieved, such as by pulling after application of the swellable. In other examples, the advance seal may left downhole such as to form part of the completed swellable seal (e.g. for abandonment). In at least some examples, the advance seal may be provided downhole of an intended location for the swellable seal. For example, the advance seal may be applied to at least temporarily seal in fluids in a bore whilst the swellable seal is applied to form a swellable seal above the advance seal. The advance seal may be provided uphole of an intended location for the swellable seal. The swellable may be applied below the advance seal, such as by injection or supply through a port, valve, conduit or other flowpath through the advance seal. In at least some examples, a plurality of advance seals may be provided, such as above and below an intended location for the swellable seal. In at least some examples, the advance seal may be deployed or run-in together with a swellable applicator. For example, the advance seal may be run-in and activatable on a tool-string comprising the swellable applicator—or at least an applicator outlet for applying the swellable. The tool-string may comprise one or more of: coiled tubing, wireline, slickline. At least a portion of the tool-string may be retrievable, such as after application of the swellable. In at least some embodiments, the swellable may be applied without tool-string apparatus, such as by applying the swellable remotely, such as directly from the wellhead or surface.

The method may comprise providing one or more of the following in an operation associated with the application of the swellable: cement; slurry; gelled pills; bentonite; spacers (e.g. to protect cement/slurry/swellable); mechanical plug (e.g. retainer/s); inflatable plug/s; expandable plug/s; sand plug/s (e.g. as basis for cement).

The method may comprise a preparatory operation prior to the application of the swellable. The preparatory operation may comprise the preparation of at least a portion of the bore. The preparatory operation may comprise one or more of: acidizing at least a portion of the bore; reaming at least a portion of the bore; under-reaming at least a portion of the bore; fracturing at least a portion of the bore; increasing a receptiveness of at least a portion of the bore to the swellable; removing apparatus and/or portion/s of the formation adjacent the bore; removing a portion of casing or other tubular; creating a window in a casing or other tubular; scraping at least a portion of the bore; perforating at least a portion of the bore, such as with a perforating gun/s. The preparatory operation may comprise the provision of surface/s and/or volume/s conducive to the swellable forming a well-anchored seal in the bore. For example, the perforation operation may assist in the penetration of the swellable into the formation, such as to provide a portion of the swellable seal extending beyond a general or adjacent cross-section or wall of the bore so as to resist longitudinal movement of the swellable seal in the bore. The preparatory operation may provide one or more volume/s to accommodate a three-dimensional swell of the swellable, such as swell of the swellable in a direction that may comprise a non-radial vector component. The preparatory operation may assist in reducing or eliminating a generally or purely linear flowpath, such as axially along a bore or casing wall. The preparatory operation may comprise the running in and/or out of preparatory apparatus in the bore. In at least some examples, the preparatory apparatus may be run in and/or out together with the advance seal and/or the swellable applicator—or at least the applicator outlet for applying the swellable. At least one preparatory operation may be performed during a same trip as the application of the swellable. In at least some example methods, at least one preparatory operation may be performed prior to the application of the swellable, such as prior to the running in of apparatus associated with the injection of the swellable (e.g. a conduit, injector, nozzle or the like).

In at least some examples, the method may comprise leaving cuttings downhole. For example, the method may comprise recirculating at least a portion of cuttings and/or debris to form a portion of the seal, such as to supplement or augment the swellable seal.

The method may comprise measuring the seal. The method may comprise measuring one or more seal parameters, such as during and/or after application of the swellable and/or after activation of the swellable. The method may comprise validating the seal. In at least some example methods, the seal may be tested, such as with a pressure test to evaluate seal integrity.

In at least some examples, the method may comprise the repair of a section of bore. The method may comprise repairing an intermediate section, such as an intermediate section of an incorrectly fractured well. In at least some examples, the completed swellable seal may provide an annular seal. In such examples, the method may comprise providing a flowpath extending through the repaired section of well, such as by providing a tubular or other fluid conduit extending longitudinally through the swellable seal. In other examples, the method may comprise terminally plugging improperly fractured sections, such as to prevent access to and/or from beyond the improperly fractured section.

The method may comprise permanently isolating a section of well, such as a fractured well. In at least some examples, the method may comprise isolating a section that is allowing or could allow contamination, such as of a water source by gas and/or oil. The method may comprise preventing contaminated surface water entry, such as of minerals, waste, bacteria, etc. The method may comprise preventing leakage between an aquifer and surface (to and/or from). The method may assist in preventing egress into the well.

The method may comprise permanently sealing the bore, such as for abandonment. The method may comprise permanently sealing the bore with the swellable.

In at least some examples, the method may comprise irreversibly sealing the bore. In such examples, the swellable may comprise an inert, resistant chemical, at least after application, such as after setting, curing or activation. In other examples, the method may comprise reversibly sealing the bore. Such other examples may comprise re-opening an abandoned well or section. For example, the seal may be broken such as by: mechanical removal; perforation or re-perforating; acid stimulation; creating permeable paths; fracturing; and/or flushing. In at least some examples, the swellable seal may be bypassed, such as by side-tracking, drilling through or drilling out.

The swellable sealing may be reversible by applying an antidote product, such as by injecting or pumping in an antidote fluid. The antidote fluid product comprise an antidote chemical, such as a particular acid or agent that chemically and/or thermally and/or mechanically damages the swellable and/or a matrix, filler or other substance that may hold the swellable in position.

The method may comprise the use, reuse or recycling of components or materials. For example, the method may comprise the use, reuse or recycling of swellable components or materials. The method may comprise using leftover production materials, such as from the production processes for: swellable packers; gaskets or other pre-formed swellable products. The method may comprise the reuse of excess or waste material from the production of other prefabricated swellable product/s. The method may comprise the pre-processing or pre-treatment of such material prior to application into the bore. For example, the method may comprise the refinement or granulisation of the material, such as to provide particles, pellets, fiber/s or granules of a predetermined size and/or shape for application into the bore. The method may comprise conditioning the particulate swellable. The method may comprise one or more of: categorisation; separation; adaption of the swellable particulates to provide swellable particulates of a particular size/s and or shape/s. The method may comprise coating the particulate swellable. For example, the method may comprise coating the swellable particles with a coating to inhibit or delay swelling. The coating may be configured to allow the application of the swellable without activation of the swellable. The coating may assist in the application of the swellable with and/or into an activating fluid. For example, where the swellable is an oil-swellable, the swellable particles may be coated so as to prevent initial swelling such as to allow the swellable to be injected by pumping with an oil-based carrier fluid. The coating may enable a delay or timing management of the activation of the swellable. The coating may be an adaptable coating, such as to be mechanically and/or thermally and/or chemically adapted, such as by or during the application process—or a subsequent process (such as by flushing with an agent to act on the coating). The coating may be adaptable so as to be at least partially removed from the swellable particles and/or so as to be at least partially activatable so as to set or mechanically join or bond with the coating portion/s of other coated swellable particles and/or the swellable. In at least some examples, the coating may be adaptable so as to set to form a matrix to hold the swellable particles in place.

In at least some examples, the coating and/or swellable may comprise a resistance to one or more of: chemicals; hydrogen sulphide; acid; high temperature hydrocarbons; high pressure hydrocarbons; temperatures up to 500 F, 650 F, respectively; pressures up to 18,000 psi; temperatures below freezing, such as down to −60 C.

The method may comprise a selection of an optimum swellable characteristic/s. The optimum swellable characteristic/s may comprise one or more of: swellable particle size; swellable chemical composition; swellable particle shape; swellable activation fluid (e.g. oil-based and/or water-based); chemical resistivity; thermal resistivity or combinations hereof, such as mixture/s of particle sizes and/or particle shapes. The method may comprise performing the selection with the aid of calculation and/or simulation; such as a simulation based upon a model of one or more bore characteristics.

The method may comprise providing the seal to obstruct a throughbore, such as a central throughbore. Additionally, or alternatively, the method may comprise providing the seal in the bore so as to obstruct an annulus, such as an annular passage between a casing or other tubular and the borewall or another casing or tubular, such as longitudinally overlapping (e.g. concentric) casing or tubular.

The method may comprise providing a seal at a downhole control line. The control line may comprise a cable and/or conduit. The conduit may comprise a fluid passage, such as for a hydraulic line or an injection line. The control line may comprise a plurality of lines, such as a plurality of conduit/s and/or wire/s or cable/s. The control line may comprise a bumper line. The method may comprise using the swellable to permanently seal in a cable/control line during abandonment. The method may comprise preventing a potential leak path at or along the control line. The method may comprise providing a seal around a downhole control line/s. In at least some examples, the provision of a swellable may mitigate against the existence or development of a potential leakpath, such as where a more conventional cementing and/or non-swellable polymer may otherwise leave a potential leak path. In at least some examples, the method may provide an alternative to the removal of at least sections of control line during abandonment. For example, the provision of the swellable may negate a requirement to remove a minimum length of control line from a well to be abandoned, potentially saving considerable time for removing the control line, and saving associated expense. For example, the method may facilitate the abandonment of a well comprising all or substantially comprising all of the casing and/or liner and/or control line and/or production tubing. In at least some examples, the method may comprise not removing any of: casing; and/or liner; and/or control line; and/or production tubing. The method may comprise leaving the casing; liner and/or control line downhole. The method may comprise not pulling a length of control-line, and optionally associated casing or liner, to provide a control-line free length of bore for abandonment.

In at least some examples, the swellable seal may comprise a length at least as long as a corresponding length of control line that may otherwise be required to be removed for bore abandonment. Following application, the swellable seal may comprise a length of 150 metres or more.

The method may comprise applying the swellable via at least a portion of one or more control line/s. For example, the swellable may be pumped via a control line from an uphole location, such as the wellhead and/or surface, to a location in the bore. The swellable may be pumped to a location downhole of where the swellable seal is to be established, such as at an outlet from the control line for the swellable, the outlet being downhole of the swellable seal location. Additionally or alternatively, the method may comprise supplying the activation fluid via at least a portion of one or more control line/s. For example, the activation fluid may be pumped via a control line from an uphole location, such as the wellhead and/or surface, to a location in the bore. The activation fluid may be pumped to a location down hole of where the swellable seal is to be or is being established, such as at an outlet from the control line for the activation fluid.

The method may comprise sealing a portion of a bore to inhibit lateral flow of fluid into and/or out of the portion of bore whilst allowing fluid flow longitudinally through the portion of bore. The method may comprise sealing the portion of bore automatically. The method may comprise sealing a water-producing portion of a hydrocarbon bore. The method may comprise annularly sealing around a passage, such as a central passage, of the bore such as to allow fluid to flow longitudinally in the passage of the bore through the sealed portion. The method may comprise providing the swellable as an alternative or addition to water-production control. In at least some examples, the swellable may provide an alternative or replace an inflow control device. The swellable may be provided so as to provide an automatic seal against water-production at any localised areas of water production. Accordingly the method may allow the continued hydrocarbon production from a water-producing payzone where only a portion of that payzone is producing water. In comparison or contrast to compartmentalised payzones, such as separated by flow control devices, controllable screens, or the like, at least some methods may provide a water-production control system that is automatically self-adjusting continuously along its length. The swellable may be provided permanently during production, such as installed at or prior to the commencement of production (e.g. forming part of a completed well, such as a cased well). In other examples, the swellable may be provided after commencement of production, such as during an intervention or remediation. For example, where a well starts producing water unexpectedly or in a location otherwise poorly-equipped to deal with water production, the swellable may be applied—in particulate form—to the location. The swellable may be applied by the removal of a portion of casing, liner or other tubular member and replacement with a screen, filter or other member for retaining the particulate swellable, with the particulate swellable being applied to the filter, screen or other retaining member. The method may comprise providing the filter, screen or other retaining member to the location such as to allow the entrapment of the particulate swellable against the filter, screen or other retaining member. In at least some examples, the method comprises running in the filter, screen or other retaining member to the location, securing the filter, screen or other retaining member in the location and applying the particulate swellable to an annulus defined by the filter, screen or other retaining member. The annulus defined by the filter, screen or other retaining member may be an external annulus, such as between the filter, screen or other retaining member and the bore wall or (other) casing/liner. In other examples, the annulus defined by the filter, screen or other retaining member may comprise an internal annulus, such as within the filter, screen or other retaining member. In such examples, a further member may be supplied, such as a further filter, screen or other retaining member or a tubular member, in order to provide an internal longitudinal passage within the swellable seal located within the filter, screen or other retaining member. The method may comprise applying the swellable so as to provide a choke facility in the well. The swellable may be applied without providing a seal until activated. For example, where applied to provide an automatic seal against water-production, the applied swellable may allow flow therethrough of hydrocarbons. The applied swellable may provide a seal only upon activation by the presence of water. Accordingly the applied swellable may only provide a seal where water is actually produced.

The method may comprise applying the swellable prior to production from the well. For example, the method may comprise applying the swellable during the completion of the well. In at least some examples, the swellable may be applied to an annulus, or an annular portion, of the bore. The method may comprise applying the swellable in particulate form to the annulus or annular portion of the well. The method may comprise creating the annulus, such as by running in a casing, liner, screen or tubular member. In at least some methods, the swellable may be applied by supplying the swellable down the annulus, such as down the annulus from the wellhead. The swellable may be applied in a circulation, with a carrier pumped down the annulus and returned via another fluid passage, such as an inner (e.g. central) passage of the casing, liner, screen or other tubular member defining the annulus or annular portion. The method may comprise applying the swellable to a screen, filter or other retaining member supplied with at least one straddle packer.

In at least some examples, the method may comprise applying the swellable to provide a temporary seal. For instance, the method may comprise applying the swellable to a location to provide a seal at the location to enable a further operation, such as a further intervention or remediation operation to be performed, without fluid passing to and/or from the location sealed by the applied swellable.

According to a further aspect there is provided a bore comprising a seal. The seal may be as described in any other aspect, embodiment, example or claim of this disclosure.

The bore may be comprised in a well. The well may comprise an abandoned well. The well may comprise a plugged well. The well may comprise a pressurised well. The well may comprise a completed well. The well may comprise a hydrocarbon well. The well may comprise a post-production well. The well may comprise a high temperature well. The well may comprise a high-pressure, high-temperature well. The well may comprise an offshore well. The well may comprise a wellhead. In at least some examples, the well may comprise a test well. The well may comprise an exploration well. The well may comprise a subsea well. The well may comprise a deep water well. The well may comprise an injection well, such as a water injection well. The well may comprise a lift well, such as a gas-lift well.

The bore may comprise a blind bore. The bore may comprise an open hole.

According to a further aspect there is provided an apparatus for sealing in a bore. The apparatus may comprise an injector for injecting at least the swellable for forming the seal as described in any other aspect, embodiment, example or claim of this disclosure.

According to a further aspect there is provided a swellable for sealing in a bore. The swellable may be that as described in any other aspect, embodiment, example or claim of this disclosure. The swellable may be configured for application, such as injection, for the sealing of a bore, such for abandonment. In at least some examples, the swellable may comprise a particulate form, such as one or more of: pellet; granule; fiber; and/or powder. The swellable may be comprised in a container.

According to a further aspect there is provided a container for the swellable. The swellable may comprise any of the features of the swellable of any other aspect, embodiment, example or claim of this disclosure. The container may comprise an outlet for the supply of swellable from the container into the bore; such as an outlet for connection to a pump or other swellable injections system for injecting the swellable into the bore.

According to a further aspect there is provided a method of manufacturing the device or apparatus of any other aspect, example, embodiment or claim. The method may comprise additive or 3D printing. The method may comprise transferring manufacturing instructions, such as to or from a computer (e.g. vie internet, e-mail, file transfer, web or the like).

According to a further aspect, there is provided a method of providing a swellable seal in a bore, the method comprising determining at least one characteristic of the swellable or application thereof based upon a computer model.

Another aspect of the present disclosure provides a computer program comprising instructions arranged, when executed, to implement a method in accordance with any other aspect, example or embodiment. A further aspect provides machine-readable storage storing such a program.

The invention includes one or more corresponding aspects, embodiments or features in isolation or in various combinations whether or not specifically stated (including claimed) in that combination or in isolation. For example, it will readily be appreciated that features recited as optional with respect to the first aspect may be additionally applicable with respect to the other aspects without the need to explicitly and unnecessarily list those various combinations and permutations here (e.g. the device of one aspect may comprise features of any other aspect). Optional features as recited in respect of a method may be additionally applicable to an apparatus or device; and vice versa.

In addition, corresponding means for performing one or more of the discussed functions are also within the present disclosure.

It will be appreciated that one or more embodiments/aspects may be useful in at least partially sealing.

The above summary is intended to be merely exemplary and non-limiting.

Various respective aspects and features of the present disclosure are defined in the appended claims.

It may be an aim of certain embodiments of the present disclosure to solve, mitigate or obviate, at least partly, at least one of the problems and/or disadvantages associated with the prior art. Certain embodiments may aim to provide at least one of the advantages described below.

BRIEF DESCRIPTION OF THE DRAWINGS

These and other aspects of the present invention will now be described, by way of example only, with reference to the accompanying drawings, in which:

FIG. 19b is a detail view of FIG. 19a;

FIG. 26a is a schematic view of a portion of an example well with a swellable being applied;

FIG. 26b is a schematic view of the portion of the example well of FIG. 26a showing a further stage of the swellable being applied;

FIG. 26c is a schematic view of the portion of the example well of FIG. 26b showing a further stage of the swellable being applied;

FIG. 26d is a schematic view of the portion of the example well of FIG. 26c showing a further stage of the swellable being applied;

FIG. 26e is a schematic view of the portion of the example well of FIG. 26d showing a further stage of the swellable being applied;

FIG. 26f is a schematic view of the portion of the example well of FIG. 26e showing the swellable after application.

DETAILED DESCRIPTION

Figure 1:
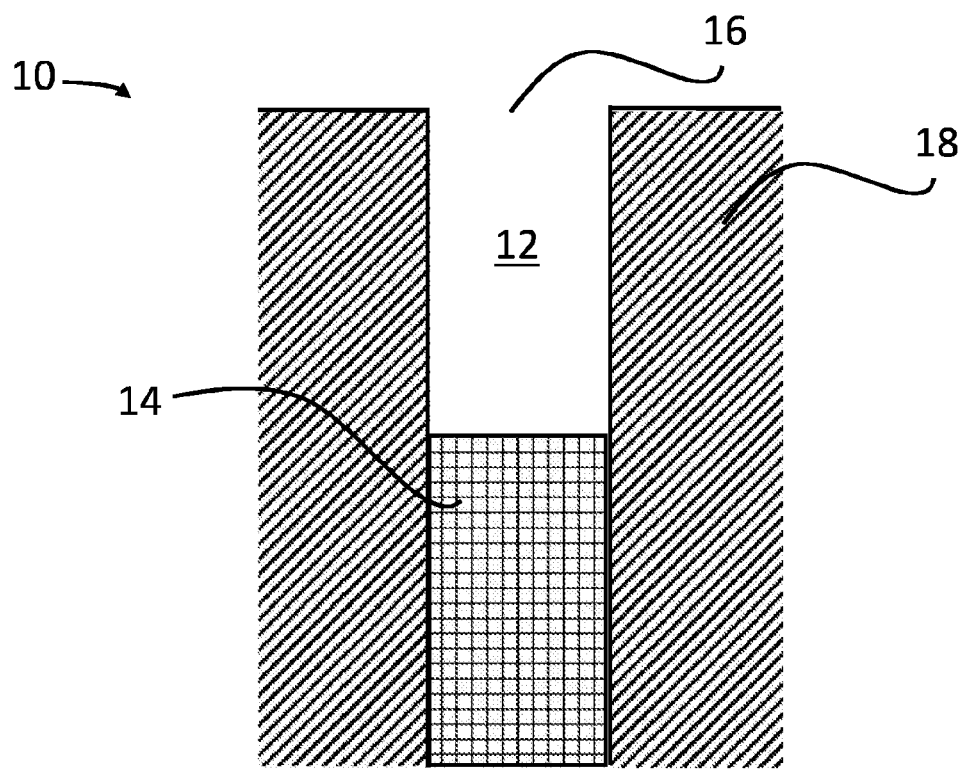
FIG. 1 is a sectional side view of a portion of a well in accordance with a first example.

Referring first to FIG. 1, there is shown a portion of a well 10 in accordance with a first example. Here, the well 10 comprises a bore 12 with a seal 14 applied. Here, the seal 14 comprises a swellable polymer.

The swellable has been applied here in particulate form as a flowable into the bore 12, by injecting the swellable in a flow into the bore 12. Although not shown here, in at least some examples the flow comprises a carrier for the swellable, such as a carrier fluid or liquid. The swellable was fluid-borne, at least for injection into the bore 12. It will be appreciated that the swellable has been applied remotely by pumping from an uphole location, such as from a wellhead 16, without tool-string apparatus.

Rather than apply the seal 14 in the form as shown in FIG. 1, the swellable was applied as a plurality of elements, in a non-annular, indefinite form. Providing the swellable as a non-preformed swellable prior to application allowed the swellable to be poured or pumped in particulate form into the bore 12. It will be appreciated that the particulate form comprised one or more of: granules, pellets, powder/s, fiber/s. Prior to application, the swellable comprised an indeterminate or non-defined arrangement or relationship between the particles of the swellable. The method comprised not pre-forming the swellable prior to insertion into the bore 12.

Here, the swellable is a synthetic elastomeric polymer-based swellable rubber that is both water-swellable swellable and oil-swellable. The swellable has been applied such as to form the seal 14 to prevent a flow of fluid/s longitudinally along the bore 12. The swellable has been applied such as to form a swellable seal along a longitudinal section or length of the bore 12. Here, the swellable seal comprises a length of at least 200 metres. Preventing a flow of fluid/s along the bore 12 comprises preventing a flow of fluids out of and/or into the bore 12, such as axially out of and/or axially into the bore 12.

The longitudinal length of the swellable seal 14 along the bore 12 was determined by an amount of swellable injected into the bore 12, being the volume of swellable injected into the bore 12. The geometric form of the swellable prior to application was determined or defined by a container for the swellable prior to application. The method comprised determining the volume of swellable to be applied. Determining the volume of swellable to be applied comprised calculating a desired seal volume within the bore 12. The desired seal volume was determined according to a desired seal length along the bore 12, here in combination with a cross-section/s of the bore 12 along said desired length of seal 14. As shown here, the seal 14 may also prevent or assist in preventing the flow of fluids laterally into and/or out of the bore 12.

Figure 2:
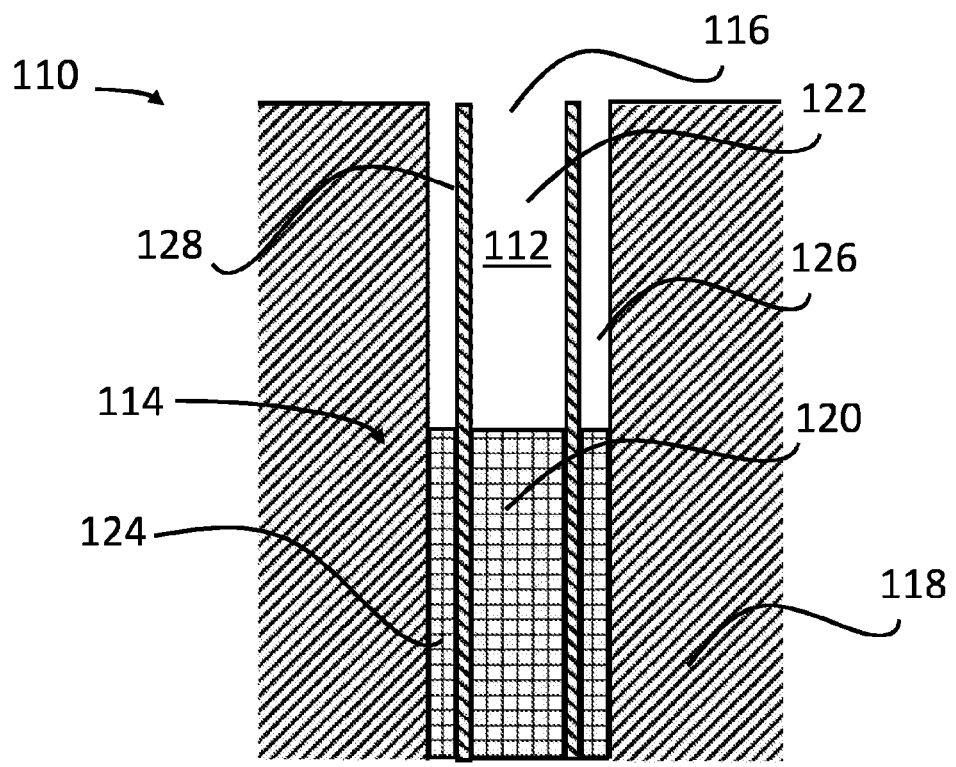
FIG. 2 is a sectional side view of a portion of a well in accordance with a further example.

Referring to FIG. 2, there is shown a further example portion of a well 110. The well 110 shown in FIG. 2 is generally similar to that shown in FIG. 1, with similar features referenced by similar reference numerals incremented by 100, not all of which are repeatedly recited in this passage of the description for brevity. Accordingly, the well 110 comprises a bore 112 and a swellable seal 114

It will be appreciated that the swellable seal of FIG. 2 has been formed using a method generally similar to that for FIG. 1, as described above. The method comprised providing the swellable in or within a container for injection into the bore 112. The container comprised an outlet for flowing or pumping the swellable out of the container into the bore 112. The shape of the swellable prior to injection into the bore was different to that of the swellable seal 114. Here, where the swellable seal 114 comprises a circular and an annular shape, the swellable comprised a non-circular or non-ring/non-annular shape prior to injection (e.g. not comprising a cross-section corresponding to a cross-section or portional cross-section of the bore 112, such as that shown in FIG. 3). The swellable comprised an indefinite or undefined shape prior to application, such as prior to insertion into the bore 112. Here, the swellable comprised an injectable or pumpable form prior to application, the swellable being comprised of multiple discrete particles, elements, granules, pellets, fibers and/or powder.

Here, the method comprises sealing-in the bore 112, such as to prevent passage of fluid/s into and/or out of the bore 112, as shown here plugging the bore 112. The swellable comprises a swellable plug, at least after or upon completion of the sealing with the swellable. Here, the seal 114 comprises a swollen swellable, at least after or upon completion of the sealing with the swellable. The method comprised at least partially swelling the swellable such as to form the seal 114. As shown here, the method comprised only partially swelling the swellable to form the seal 114. Accordingly, the seal 114 formed by the swellable comprises a swellable that is capable of subsequent swelling after the initial seal 114 has been formed. The seal 114 comprises an adaptive seal, such as capable of adapting to changes such as environmental or conditional changes over time. For example, the seal 114 is configured to swell in the presence of oil and/or water so as to re-seal or increase sealing in a subsequent presence of oil and/or water, such as may be associated with changes in the bore 112 subsequent to sealing. By way of example, where downhole pressure changes, such as in a reservoir (not shown) associated with the bore 112, establish a fluid path; or where cracks or changes in an associated formation 118 or section of sealed bore 112, the seal 114 may adapt to re-seal such as by swelling (e.g. to fill the crack/s/block the fluid path). Here, the swellable comprises an abandonment swellable, at least after or upon completion of the sealing with the swellable to abandon the well 110.

As shown here, the method comprised applying the swellable after the completion of the bore 112. The method comprised applying the swellable after termination of production from the production bore 112. In other examples, the method comprises applying the swellable before completion of the bore, such as to seal, and optionally abandon, a partial bore. For example, other methods comprise applying the swellable to one or more of: a blind bore; a test bore; a sidebranch bore; a deviated bore; a main bore; an abandoned bore; an exploration bore; a collapsed bore; a damaged bore.

Figure 3:
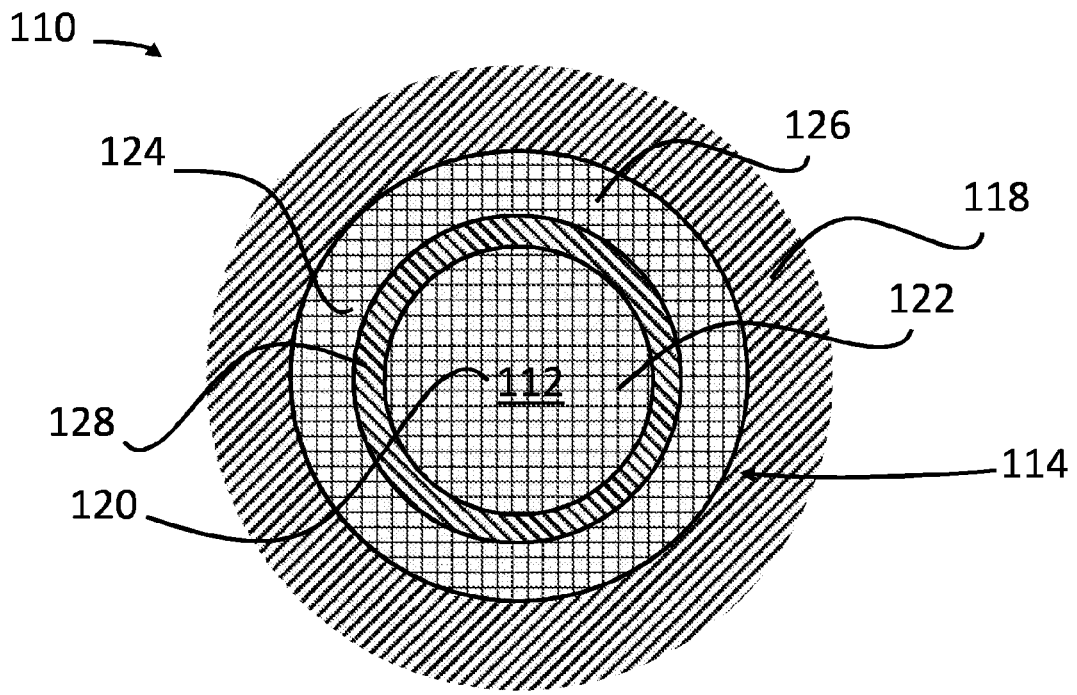
FIG. 3 is a cross-sectional axial view of the portion of the well of FIG. 2.

It will be appreciated that the swellable as applied in FIG. 2 provides a seal 114 with an inner seal portion 120 within the central passage 122 of the bore 112 and also an outer seal portion 124 in an annular passage 126 of the bore 112 defined between a casing 128 and the formation 118 (the borewall). Accordingly all fluid flow along the bore 112 is blocked by the seal 114, as shown in FIG. 3, which is a cross-sectional portion of the well 110 of FIG. 2, where the bore 112 comprises the seal 114. As shown here, the swellable comprises a water-swellable synthetic elastomeric rubber polymer that is not oil-swellable.

Figure 4:
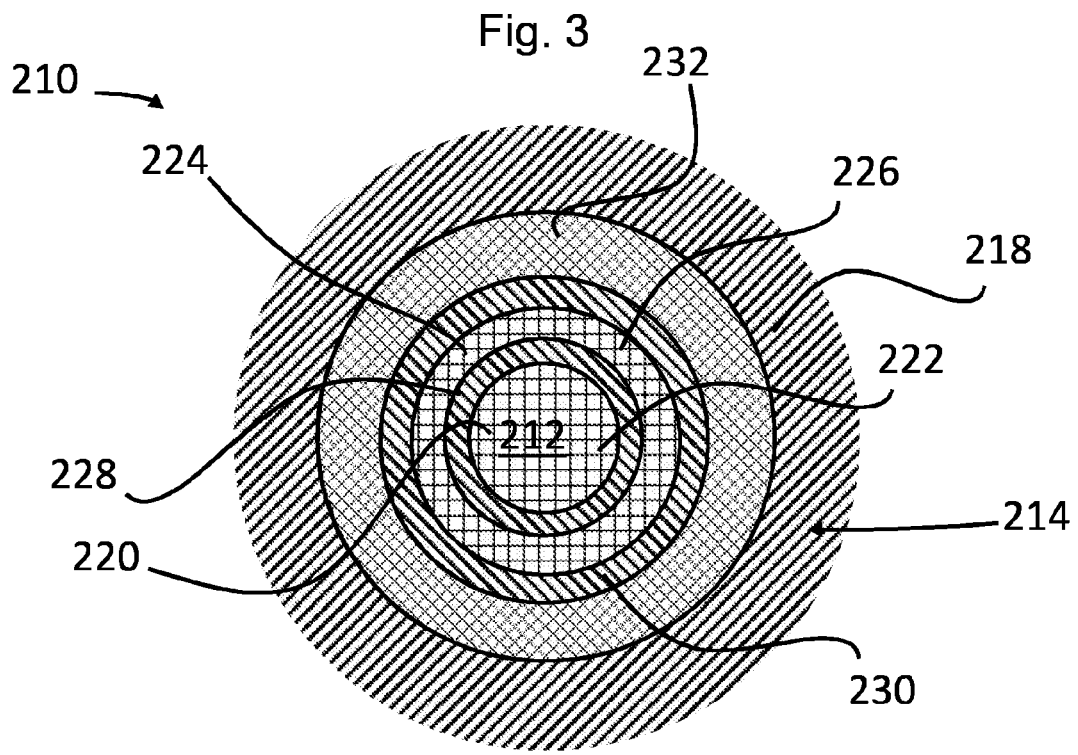
FIG. 4 is a cross-sectional axial view of a portion of a well according to a further example.

Referring to FIG. 4, there is shown a further example cross-sectional portion of a well 210. The well 210 shown in FIG. 4 is generally similar to that shown in FIG. 3, with similar features referenced by similar reference numerals incremented by 100, not all of which are repeatedly recited in this passage of the description for brevity. Accordingly, the well 210 comprises a bore 212 and a swellable seal 214. It will be appreciated that the swellable seal 214 of FIG. 4 has been formed using a similar method to that for FIGS. 2 and 3, as described above. However, rather than providing an outer seal portion 224 in an annular passage between the casing 228 and the formation 218, the outer portion 224 here is provided in an annular passage 226 between the casing 228 and an outer casing 230. It will be appreciated that the outer casing 230 was installed prior to the inner casing 228 and sealed to the formation 218 with a cementing operation in the outer annulus 232 prior to production.

Although not shown here, it will be appreciated that in at least some examples, the application method comprises applying the swellable in a mixture. Such methods comprise applying the swellable in a carrier, such as a carrier fluid. In at least some examples, the carrier comprises an inert fluid. In some methods, the carrier comprises an activating fluid. Additionally, or alternatively, the carrier comprises a spacer and/or a settable fluid. For instance, in at least some examples, the carrier contains: an activating fluid, such as an activating oil; a spacer, such as a filler fiber, aggregate, clay or the like; and a settable fluid, such as a resin, clay or the like. In some methods, additionally, or alternatively, the carrier comprises a hardening material, such as a settable cement.

Figure 5:
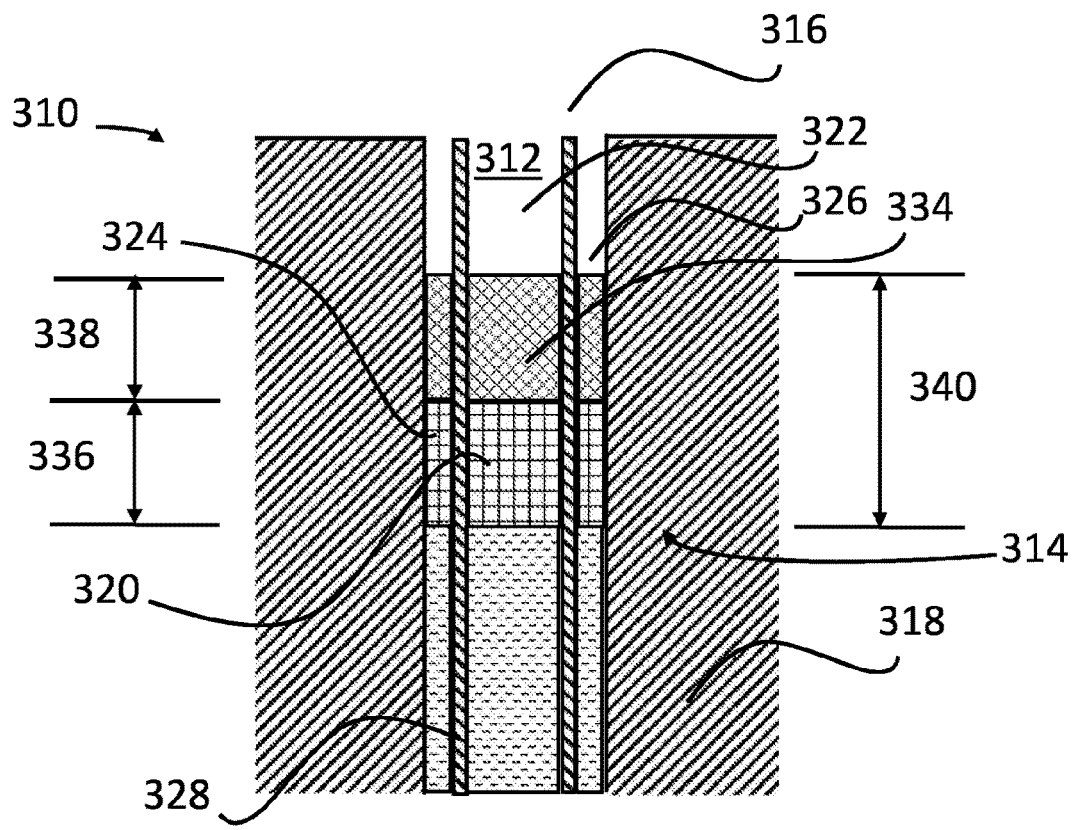
FIG. 5 is a sectional side view of a portion of a well in accordance with a further example.

Referring to FIG. 5, there is shown a further example portion of a well 310. The well 310 shown in FIG. 5 is generally similar to that shown in FIG. 4, with similar features referenced by similar reference numerals incremented by 100, not all of which are repeatedly recited in this passage of the description for brevity. Accordingly, the well 310 comprises a bore 312 and a swellable seal 314.

It will be appreciated that the swellable seal 314 of FIG. 5 has been formed using a method generally similar to that for FIGS. 2 and 4, as described above.

Here, the method comprised injecting the swellable as part of a cementing operation. Here, the swellable was injected non-simultaneously as part of a cementing operation, such as sequentially or alternately with the cement 334. In other examples (not shown), the swellable is injected as part of the cementing operation comprises injecting the cement and the swellable simultaneously, such as a cement/swellable mixture.

As shown, the method comprised a further step of sealing, such as for abandonment. The further step comprised a cementing operation. The method comprised the cementing operation as a supplementary or complementary step subsequent to the injection of the swellable, performing the cementing operation after a sealing operation with the swellable. Here, the method comprised performing the cementing operation after the swellable partially swollen and sealed to form the swellable seal 314. The method comprises applying a cement section along a length 336 of the bore 312 uphole of the section or length 338 along the bore previously sealed by the swellable in a preceding step. Accordingly, the method comprised applying a swellable seal downhole of the section of cement 334. The uphole section of cement 336 assists in longitudinally fixing or restraining the swellable seal 314, such as with the weight of the cement 334. For example, the uphole cement section 334 reduces passage and swelling of the swellable seal 314 uphole in or along the bore 312. The cement section 336 assists in constraining swelling of the swellable seal 314 to lateral swelling, such as annular or radial swelling, such as to assist in forming a seal perpendicular to the longitudinal axis of the bore 312. In at least some examples, the method comprises applying a total combined volume of swellable and cement less than may otherwise be required for a purely cementing operation (e.g. the total sealing volume or bore length 340 is less than required in a cementing only sealing operation—not shown).

Figure 6:
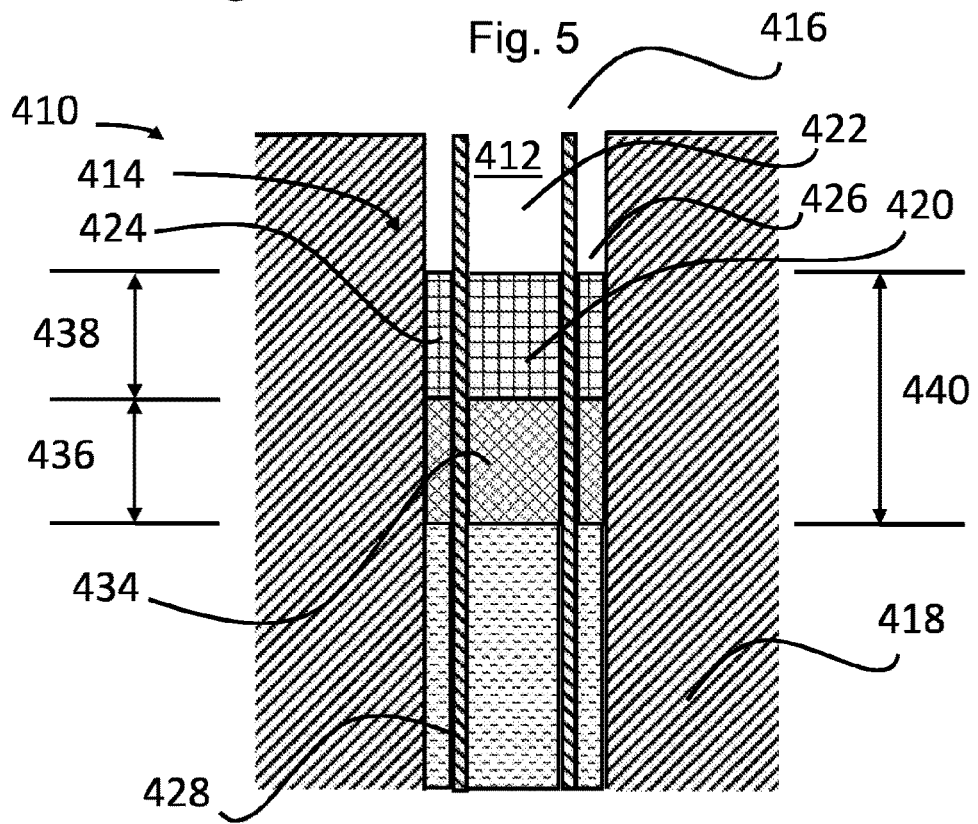
FIG. 6 is a sectional side view of a portion of a well in accordance with a further example.

Referring to FIG. 6, there is shown a further example portion of a well 410. The well 410 shown in FIG. 6 is generally similar to that shown in FIG. 5, with similar features referenced by similar reference numerals incremented by 100, not all of which are repeatedly recited in this passage of the description for brevity. Accordingly, the well 410 comprises a bore 412 and a swellable seal 414.

It will be appreciated that the swellable seal 414 of FIG. 6 has been formed using a method generally similar to that for FIG. 5, as described above.

Here, the method comprises applying the swellable uphole of a cement section or length 436. As shown here, the method comprises applying a total combined volume of swellable and cement 434 less than may otherwise be required for a purely cementing operation (e.g. the total sealing volume or bore length 440 is less than required in a cementing only sealing operation). Here, as an alternative to a subsequent cementing step, the swellable is applied after the cementing step. Here, the swellable comprises an oil-swellable synthetic elastomeric rubber polymer, comprised in a matrix for application.

Here, the method comprises reversibly sealing the bore 412. The bore 412 may be re-opened. For example, the seal 414 here can be broken such as by: mechanical removal; perforation or re-perforating; acid stimulation; creating permeable paths; fracturing; or combinations hereof, such as of mechanical drill-out and acid injection. In at least some examples, the swellable seal 414 is bypassed, such as by side-tracking, drilling through or drilling out. In other examples, the swellable seal 414 is reversible by applying an antidote product, such as by injecting or pumping in an antidote fluid. The antidote fluid product comprise an antidote chemical, such as a particular acid or agent that chemically and/or thermally and/or mechanically damages the swellable and/or a matrix, filler or other substance that may hold the swellable in position.

Figure 7:
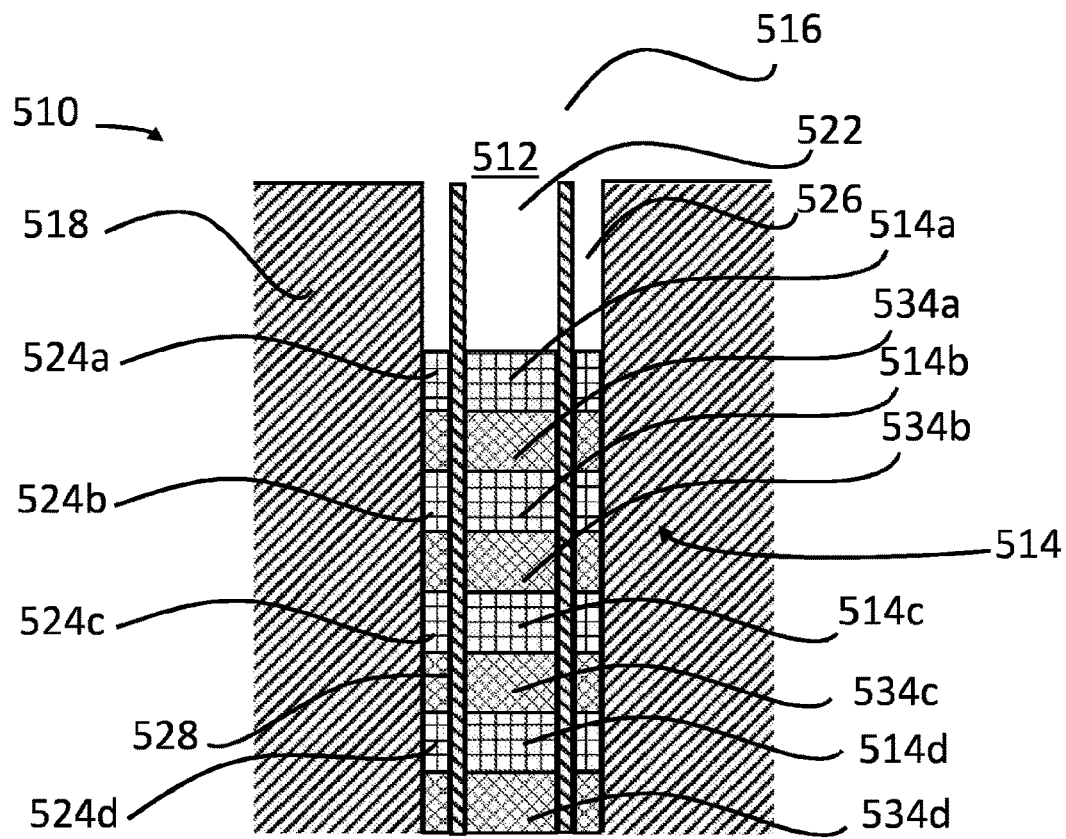
FIG. 7 is a sectional side view of a portion of a well in accordance with a further example.

Referring to FIG. 7, there is shown a further example portion of a well 510. The well 510 shown in FIG. 7 is generally similar to that shown in FIG. 6, with similar features referenced by similar reference numerals incremented by 100, not all of which are repeatedly recited in this passage of the description for brevity. Accordingly, the well 510 comprises a bore 512 and a swellable seal 514.

It will be appreciated that the swellable seal 514 of FIG. 7 has been formed using a method generally similar to that for FIG. 6, as described above.

Here, the method comprised applying the swellable as a plurality of axial layers or zones 514a, 524a, 514b, 524b, 514c, 524c, 514d, 524d within the bore 512. As shown here, the plurality of layers or zones 514a, 524a, 514b, 524b, 514c, 524c, 514d, 524d comprise the same type of swellable. In other examples, the layers or zones comprise different types as swellable, such as alternating layers of oil-swellable and water-swellable. For example, in a well with at least two layers or zones of swellable, an oil-swellable may be provided as a lower zone or layer and a water-swellable provided as an upper zone or layer. Here, the distinct layers or zones of swellable 514a, 524a, 514b, 524b, 514c, 524c, 514d, 524d have been applied sequentially, separated by intermediate layer/s or zone/s of cement 534a, 534b, 534c, 534d. The method comprised sandwiching some of the layers or zones 514b, 524b, 514c, 524c, 514d, 524d, 534a, 534b, 534c, by applying alternate layers of swellable and cement.

As shown in FIG. 7, the applied swellable 514a, 524a, 514b, 524b, 514c, 524c, 514d, 524d comprises a mixture of types of swellable, here having been applied as a plurality of different types of particulate swellable in the form of oil-swellable particles mixed with water-swellable particles.

Here, the application method comprised predetermining the plurality of axial layers or zones of swellable 514a, 524a, 514b, 524b, 514c, 524c, 514d, 524d and additional layers or zones of cement 534a, 534b, 534c, 534d, according to a simulation and computer model of the well 510. Following application of the seal 514, the method comprises measuring the seal 514, including validating the seal 514 with a pressure test to evaluate seal integrity.

Figure 8:
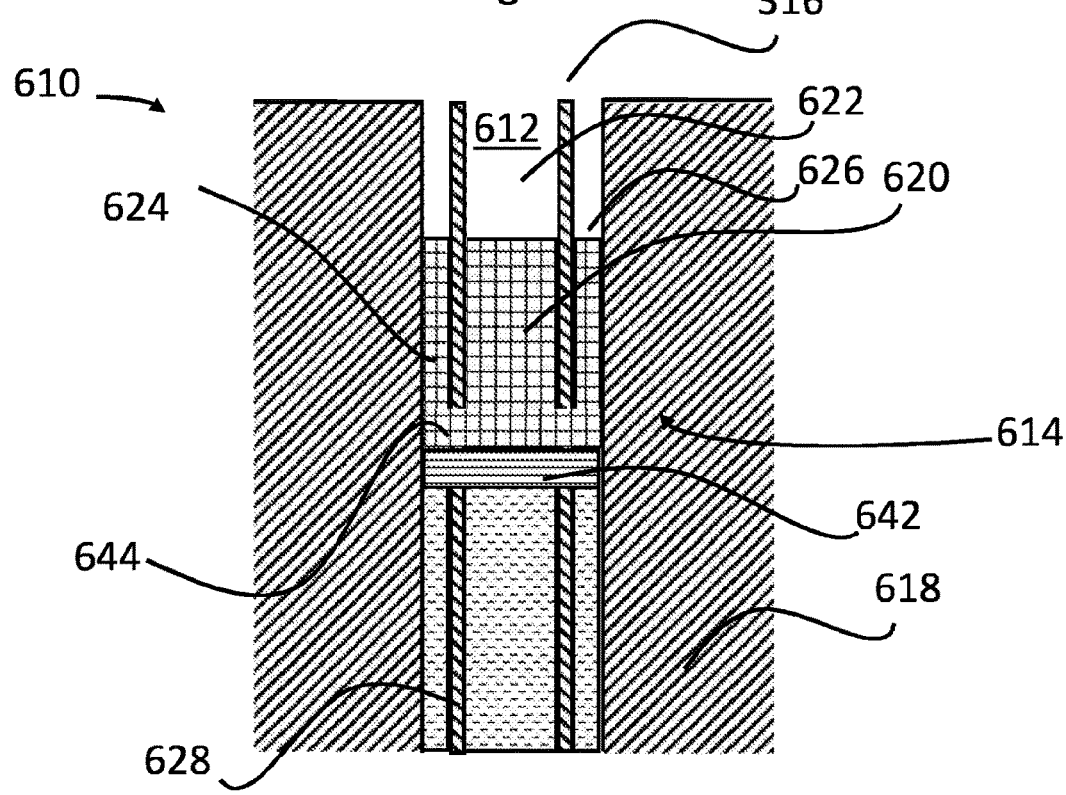
FIG. 8 is a sectional side view of a portion of a well in accordance with a further example.

Referring to FIG. 8, there is shown a further example portion of a well 610. The well 610 shown in FIG. 8 is generally similar to that shown in FIG. 7, with similar features referenced by similar reference numerals incremented by 100, not all of which are repeatedly recited in this passage of the description for brevity. Accordingly, the well 610 comprises a bore 612 and a swellable seal 614.

It will be appreciated that the swellable seal 614 of FIG. 8 has been formed using a method generally similar to that for FIG. 7, as described above.

Here, the method comprised a step prior to the application of the swellable so as to provide an advance seal 642. Firstly a portion of the casing 628 was removed to provide 360 degree full axis to the annulus 626 and bore wall via a window 644. The advance seal 642 was for stemming flow and/or pressure whilst the applied swellable forms the swellable seal 614. The advance seal 642 comprises an instantaneous mechanical seal, which is a permanent seal as shown here. The advance seal 642 is provided by a preformed seal, which is an expandable plug run in on wireline, slickline, coiled tubing or the like, with a definite deformable form, being expandable to seal across the bore 612, including the annulus 626. The advance seal 642 was provided to prevent or at least restrict a flow of fluids in the bore 612 whilst the swellable seal 614 was applied. Here, the advance seal 642 is left downhole to form part of the completed swellable seal 614 for abandonment, being provided downhole of the intended location for the swellable seal 614.

Figure 9:
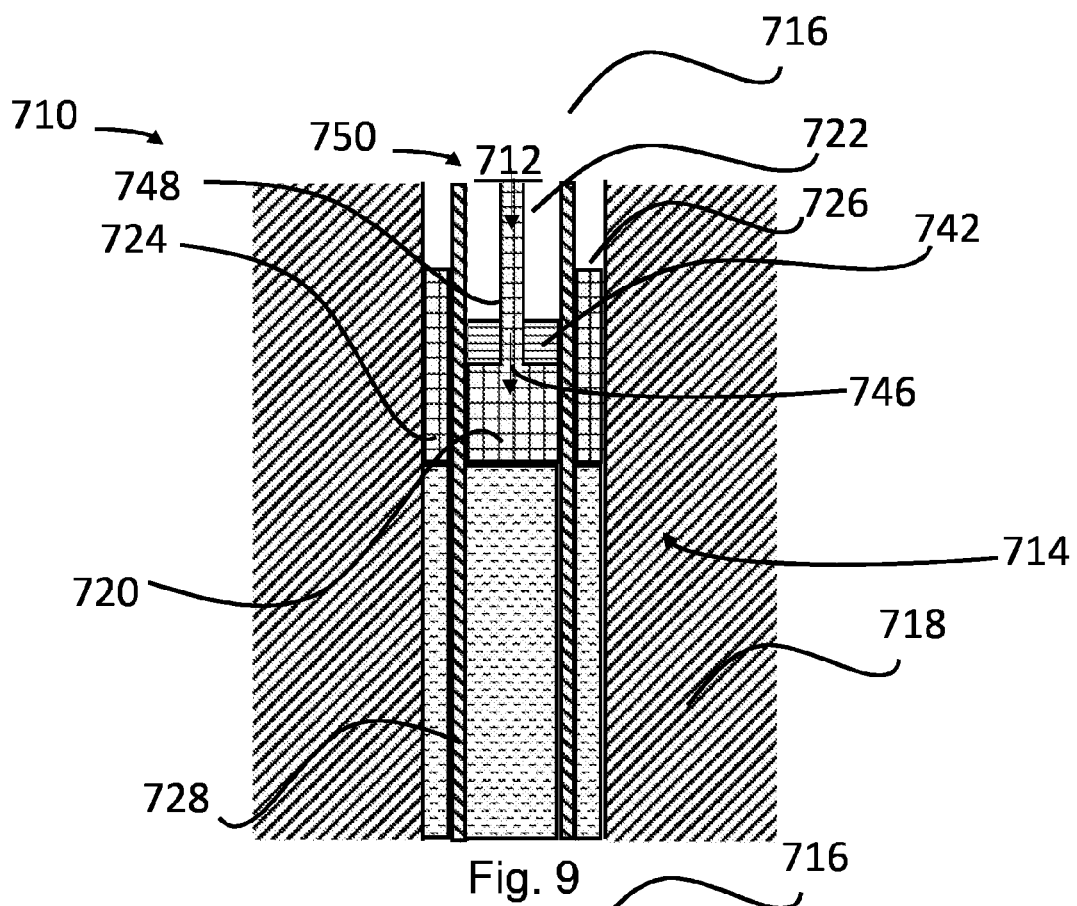
FIG. 9 is a sectional side view of a portion of a well in accordance with a further example during a first phase of sealing.
Figure 10:
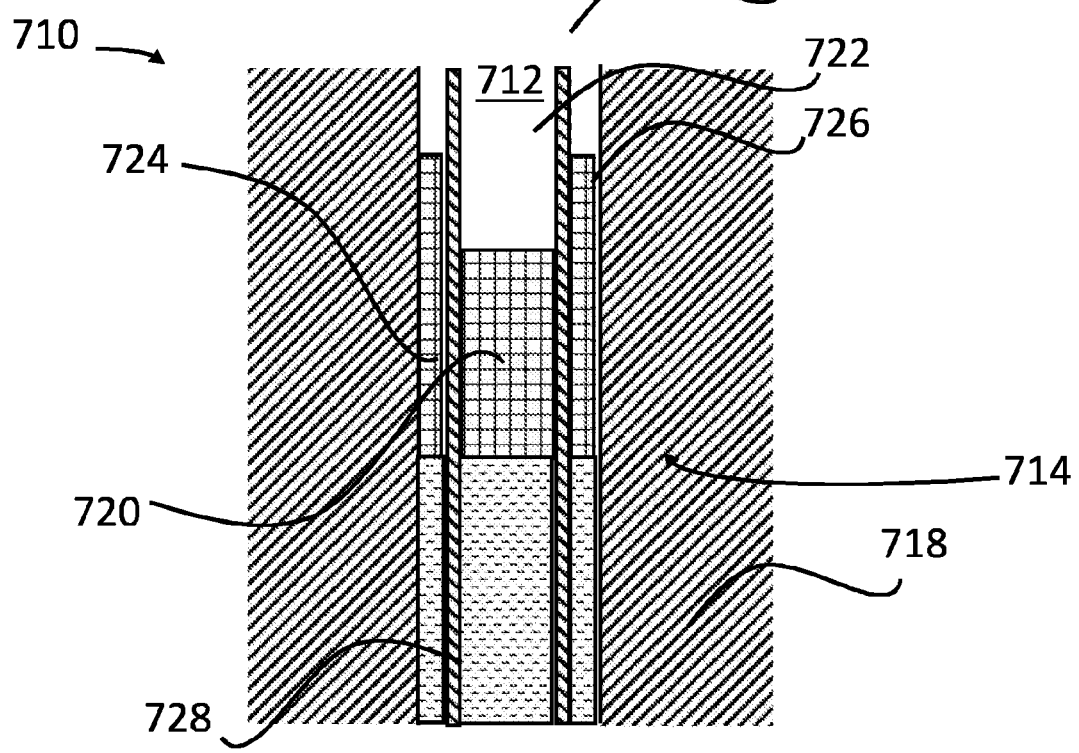
FIG. 10 is a sectional side view of the portion of the well of FIG. 9 after completion of the first phase of sealing.

Referring to FIGS. 9 and 10, there is shown a further example portion of a well 710. The well 710 shown in FIGS. 9 and 10 is generally similar to that shown in FIG. 7, with similar features referenced by similar reference numerals incremented by 100, not all of which are repeatedly recited in this passage of the description for brevity. Accordingly, the well 710 comprises a bore 712 and a swellable seal 714.

It will be appreciated that the swellable seal 714 of FIGS. 9 and 10 has been formed using a method generally similar to that for FIG. 8, as described above. FIG. 9 is a sectional side view of a portion of the well 710 during a first phase of sealing; and FIG. 10 is a sectional side view of the portion of the well 710 after completion of the first phase of sealing.

Here, the advance seal 742 is applied to at least temporarily seal in fluids in the bore 712 whilst the swellable is applied to form the swellable seal 714 below the advance seal 742. The advance seal 742 is provided uphole of the intended location for the swellable seal 714. The swellable is applied below the advance seal 742—here, by injection or supply through a one-way valve 736 from a coiled tubing conduit 748 providing a flowpath through the advance seal 742, which is a packer within the casing 728 as shown here. As shown in FIG. 9, the advance seal 742 is run-in together with a swellable applicator 750. The advance seal 742 has been run-in to the position of FIG. 9 on a CT tool-string comprising the swellable applicator 750; and then activated to expand the packer to seal against the interior of the casing 728. Here, the advance seal 742 is retrievable, such as by pulling after application of the swellable, as shown in FIG. 10, along with at least a portion of the tool-string. In other examples, a plurality of advance seals is provided, such as above and below an intended location for the swellable seal (e.g. a combination of the advance seals of FIGS. 8 and 9).

It will be appreciated that further sealing or abandonment steps may be provided, such as by adding other layer/s (e.g. cement) on top of the swellable seal 714. For example, where the swellable seal 714 is provided over a greater length of the annulus 726 than within the casing (as shown in FIG. 10), a length of seal 714 inside the casing 728 may be increased by supplying a further sealing layer (not shown), such as cement, after removal of the packer 742.

In other examples (not shown), the method comprises the repair of a section of bore. The method comprises repairing an intermediate section, such as an intermediate section of an incorrectly fractured well. In at least some examples, the completed swellable seal may provide an annular seal. In such examples, the method comprises providing a flowpath extending through the repaired section of well, such as by providing a tubular or other fluid conduit extending longitudinally through the swellable seal. For example, a conduit 748 similar to that shown in FIG. 9 extends through the swellable seal 714, such as where the valve 746 is provided in a side wall of the CT so as to direct the swellable radially outward. The conduit extends through the seal 714 to below the seal 714, providing fluid passage longitudinally across the seal when desired or selected.

In at least some examples, the method comprises applying the swellable to provide a temporary seal. For instance, the method comprises applying the swellable to a location to provide a seal at the location to enable a further operation, such as a further intervention or remediation operation to be performed, without fluid passing to and/or from the location sealed by the applied swellable.

Figure 11:
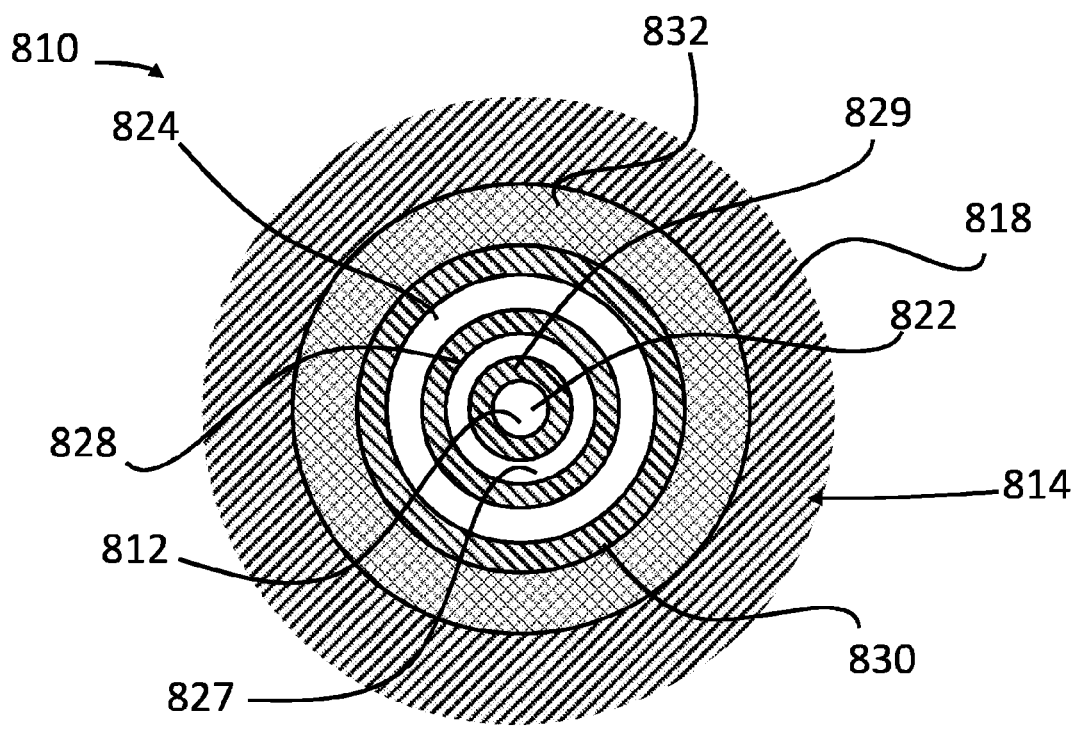
FIG. 11 is a cross-sectional axial view of a portion of a well in accordance with a further example prior to sealing.
Figure 12:
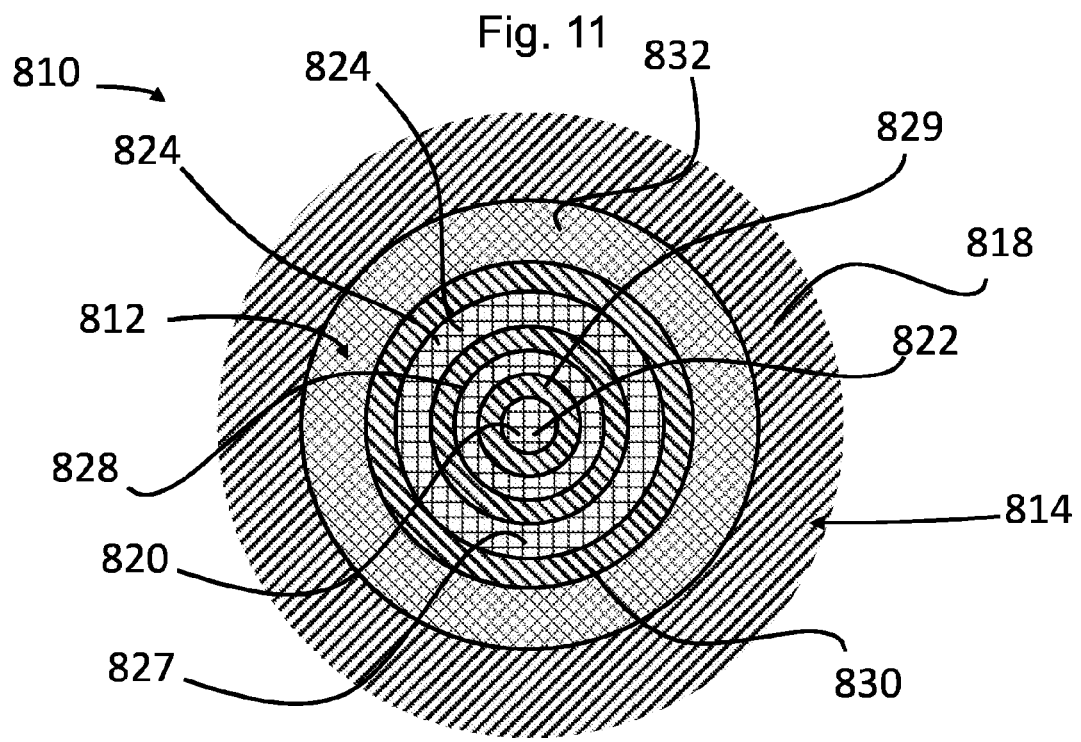
FIG. 12 is a cross-sectional axial view of the portion of the well of FIG. 11 after completion of the first phase of sealing.

Referring to FIGS. 11 and 12, there is shown a further example portion of a well 810. The well 810 shown in FIGS. 11 and 12 is generally similar to that shown in FIG. 10, with similar features referenced by similar reference numerals incremented by 100, not all of which are repeatedly recited in this passage of the description for brevity. Accordingly, the well 810 comprises a bore 812 and a swellable seal 814.

It will be appreciated that the swellable seal 814 of FIGS. 11 and 12 has been formed using a method generally similar to that for FIG. 10, as described above. However, rather than providing an outer seal portion 824 in an annular passage between the casing 828 and the formation 818, the outer portion 824 here is provided in an annular passage 826 between the casing 828 and an outer casing 830. It will be appreciated that the outer casing 230 was installed prior to the inner casing 228 and sealed to the formation 818 with a cementing operation in the outer annulus 832 prior to production. Similarly an inner casing 827 defines an inner annulus 827 within the casing 828. Here, the swellable is applied to the two annuli 826, 827 and the central bore to provide the swellable seal 814 to prevent the longitudinal passage of fluids along the axial length of the bore 812.

Figure 13:
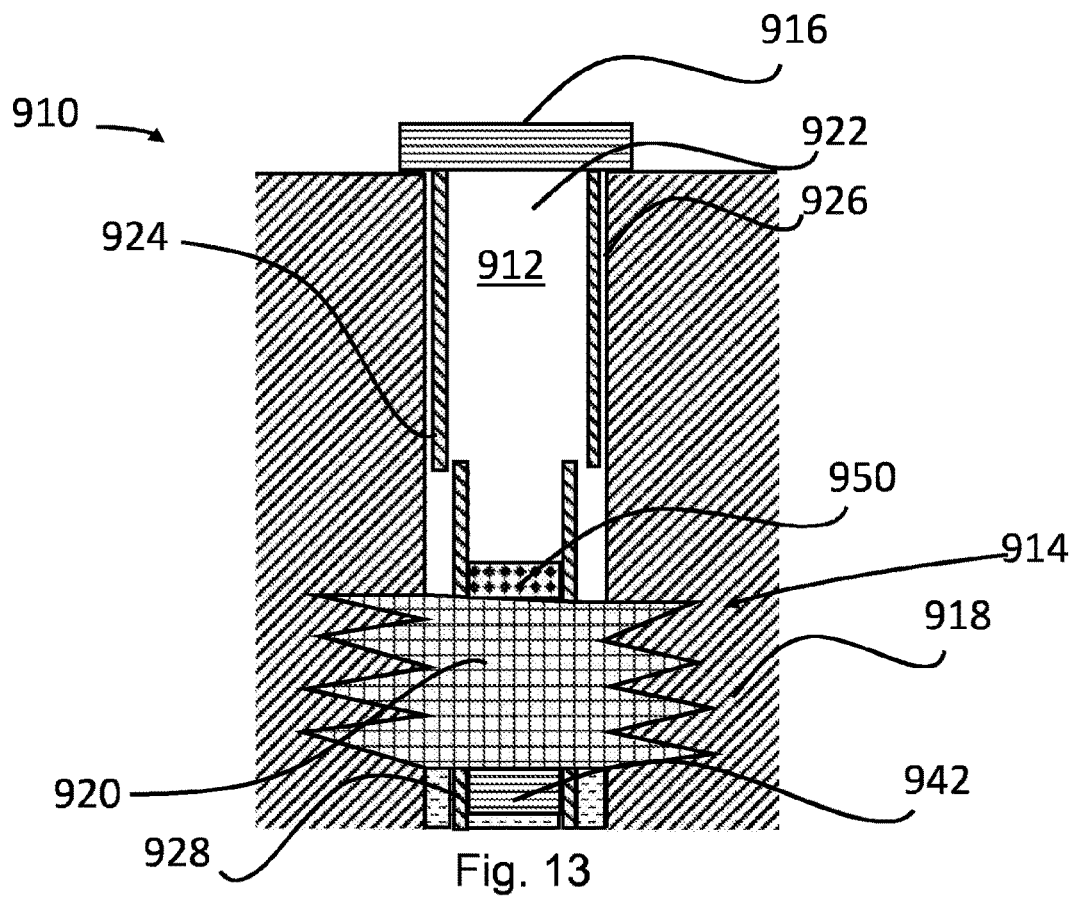
FIG. 13 is a sectional side view of a portion of a well in accordance with a further example.

Referring to FIG. 13, there is shown a further example portion of a well 910. The well 910 shown in FIG. 13 is generally similar to that shown in FIGS. 11 and 12, with similar features referenced by similar reference numerals incremented by 100, not all of which are repeatedly recited in this passage of the description for brevity. Accordingly, the well 910 comprises a bore 912 and a swellable seal 914.

It will be appreciated that the swellable seal 914 of FIG. 13 has been formed using a method generally similar to that for FIG. 12, as described above. Here, the method comprises a preparatory operation of at least a portion of the bore 912 prior to the application of the swellable. Here, the preparation comprised the fracturing at least a portion of the bore 912, thereby increasing a receptiveness of the at least a portion of the bore 912 to the swellable, by removing portions of casing 928 and portions of the formation 918 adjacent the bore 912, with a perforating gun (not shown). Accordingly the preparatory operation comprised the provision of surfaces and volumes conducive to the swellable forming a well-anchored seal 914 in the bore 912. Here, the perforation operation assisted in the penetration of the swellable into the formation 918, providing a portion of the swellable seal 914 extending beyond a general or adjacent cross-section or wall of the bore 912 so as to resist longitudinal movement of the swellable seal 914 in the bore 912. The preparatory operation provided volumes to accommodate a three-dimensional swell of the swellable, such as swell of the swellable in a direction that comprises a non-radial vector component, thereby assisting in reducing or eliminating a generally or purely linear flowpath axially along the bore 912 or wall of the casing 928. Here, the preparatory apparatus was run in together with the advance seal 942 and the swellable applicator 950. Accordingly, the preparatory operation was performed during the same trip as the application of the swellable. In other example methods (not shown), the preparatory operation is performed prior to the application of the swellable, such as prior to the running in of apparatus associated with the injection of the swellable (e.g. the CT, injector, nozzle, etc). In at least some examples, the method comprises leaving cuttings (not shown) downhole, such as by recirculating cuttings from a preparatory reaming operation to form a portion of the seal. Here, the method comprises irreversibly sealing the bore 912, such as for terminally plugging improperly fractured sections, such as to prevent access to and/or from beyond the improperly fractured section.

Here, the method comprises permanently isolating a section of well 910, such as a fractured well that is allowing or could allow contamination, such as of a water source by gas and/or oil. The method comprises permanently sealing the bore 912 with the swellable seal 914, such as for abandonment. In at least some examples, the method comprises irreversibly sealing the bore. Here, the swellable comprises an inert, resistant chemical, at least after application, such as after setting, curing or activation.

The method comprises providing the seal 914 to obstruct a throughbore, such as a central throughbore. Additionally, here the method here comprises providing the seal 914 in the bore 912 so as to obstruct an annulus 926, being an annular passage between the casing 928 and the borewall.

Figure 14:
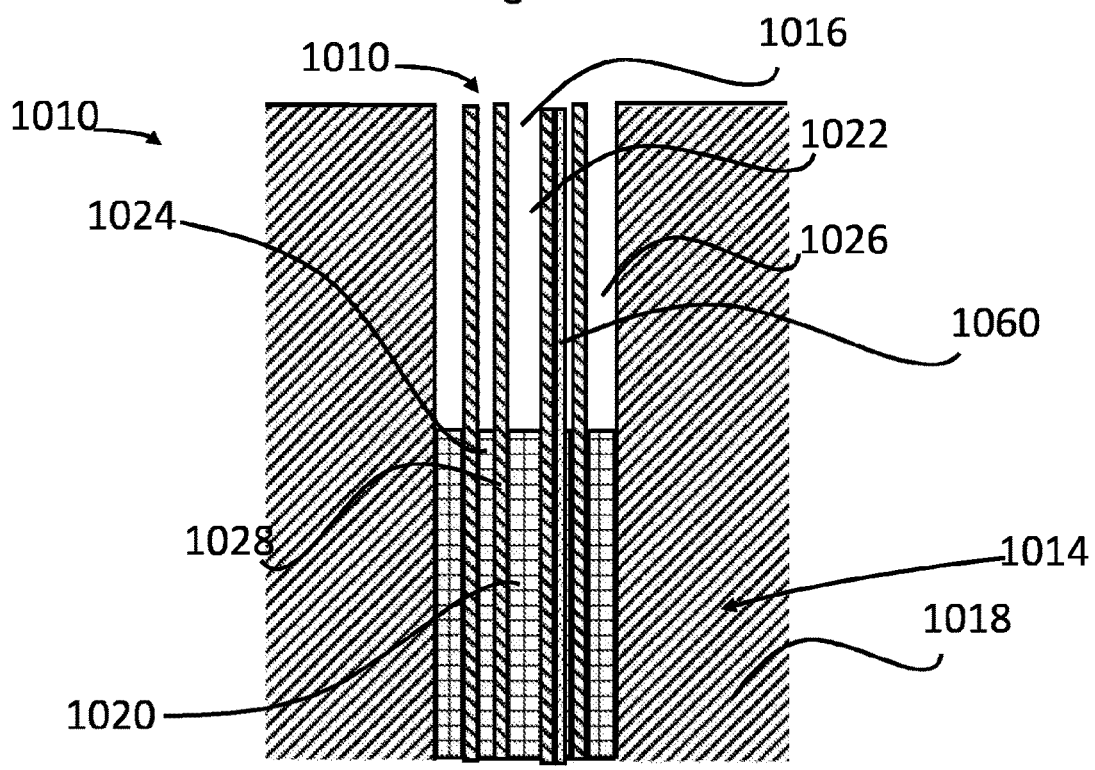
FIG. 14 is a sectional side view of a portion of a well in accordance with a further example.
Figure 15:
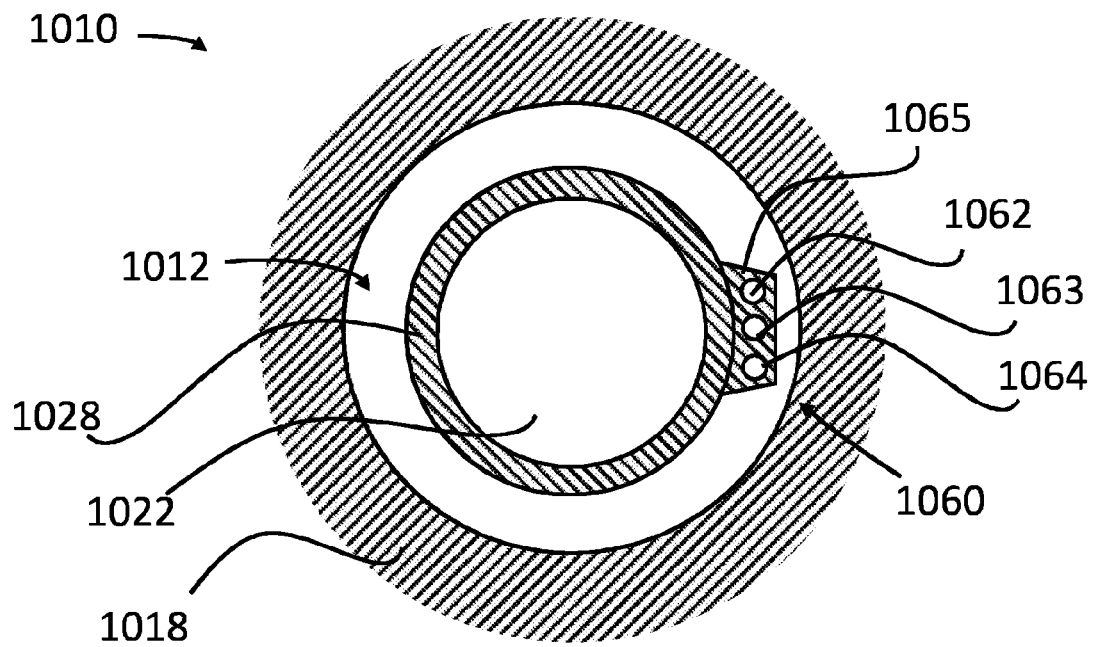
FIG. 15 is a cross-sectional axial view of a portion of a well in accordance with a further example prior to sealing.
Figure 16:
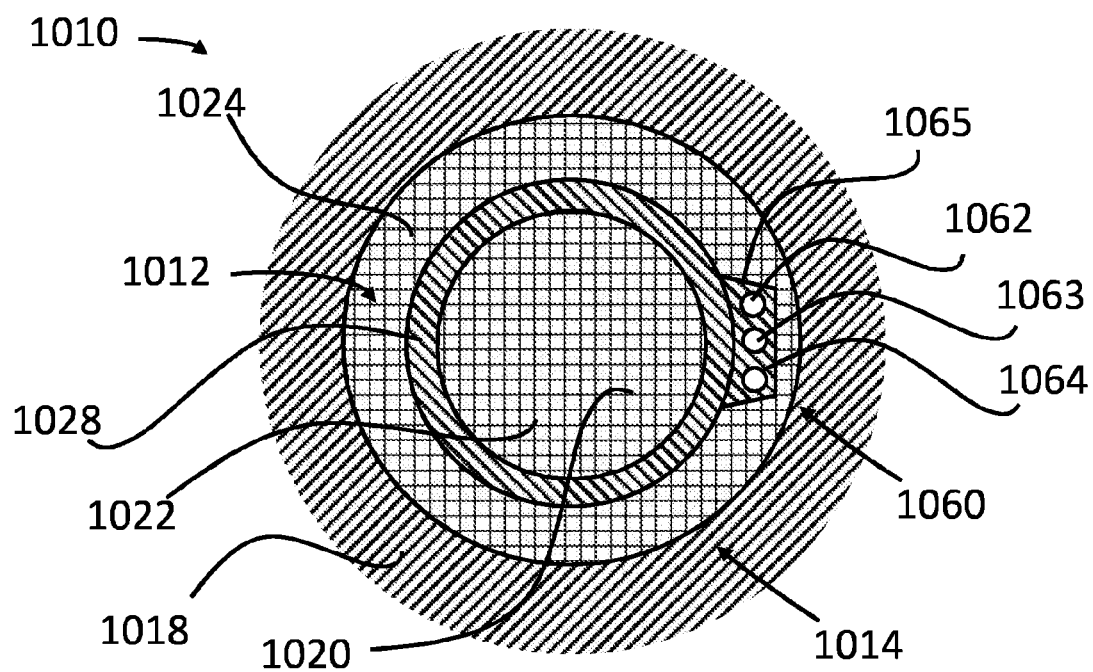
FIG. 16 is a cross-sectional axial view of the portion of the well of FIG. 15 after sealing.

Referring to FIGS. 14, 15 and 16 there is shown a further example portion of a well 1010. The well 1010 shown in FIGS. 14, 15 and 16 is generally similar to that shown in FIG. 13, with similar features referenced by similar reference numerals incremented by 100, not all of which are repeatedly recited in this passage of the description for brevity. Accordingly, the well 1010 comprises a bore 1012 and a swellable seal 1014.

It will be appreciated that the swellable seal 1014 of FIGS. 14 and 16 has been formed using a method generally similar to that for FIG. 13, as described above.

Here, the method comprises providing the seal 1014 at a downhole control line 1060, which comprises conduits 1062, 1063, 1064 in a housing 1065 here. The conduits 1062, 1063, 1064 comprise a fluid passage, such as for a hydraulic line or an injection line. The method comprises using the swellable to permanently seal in the control line 1060 during abandonment. The method comprises preventing a potential leak path at or along the control line 1060, as shown in FIG. 16, which shows the addition of the swellable relative to the unsealed well 1010 in FIG. 15. The method comprises providing the seal 1014 around the downhole control line 1060. Here, the provision of the swellable mitigates against the existence or development of a potential leakpath, such as where a more conventional cementing or non-swellable polymer may otherwise leave a potential leak path. Here, the method provides an alternative to the removal of at least sections of control line 1060 during abandonment. For example, the provision of the swellable negates a requirement to remove a minimum length of control line 1060 from the well 1010 to be abandoned, potentially saving considerable time for removing the control line 1060, and saving associated expense. Here, the method facilitates the abandonment of the well 1010 comprising all of the casing 1028 and control line 1060. The method comprises not removing or retrieving any of the casing 1028 or control line 1060, such as by pulling to surface. The method comprises leaving the casing 1028 and control line 1060 downhole.

Here, the swellable seal 1014 comprises a length at least as long as a corresponding length of control line 1060 that may otherwise be required to be removed for bore abandonment. Here, following application, the swellable seal comprises a length of 150 metres or more.

Figure 17:
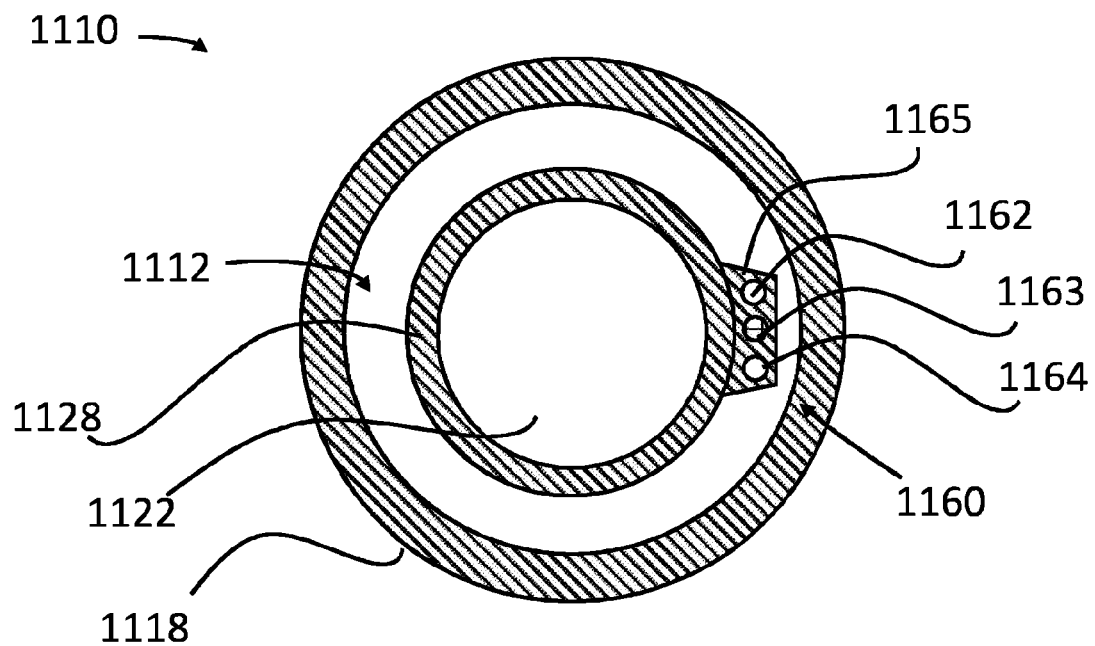
FIG. 17 is a cross-sectional axial view of a portion of a well in accordance with a further example during sealing.
Figure 18:
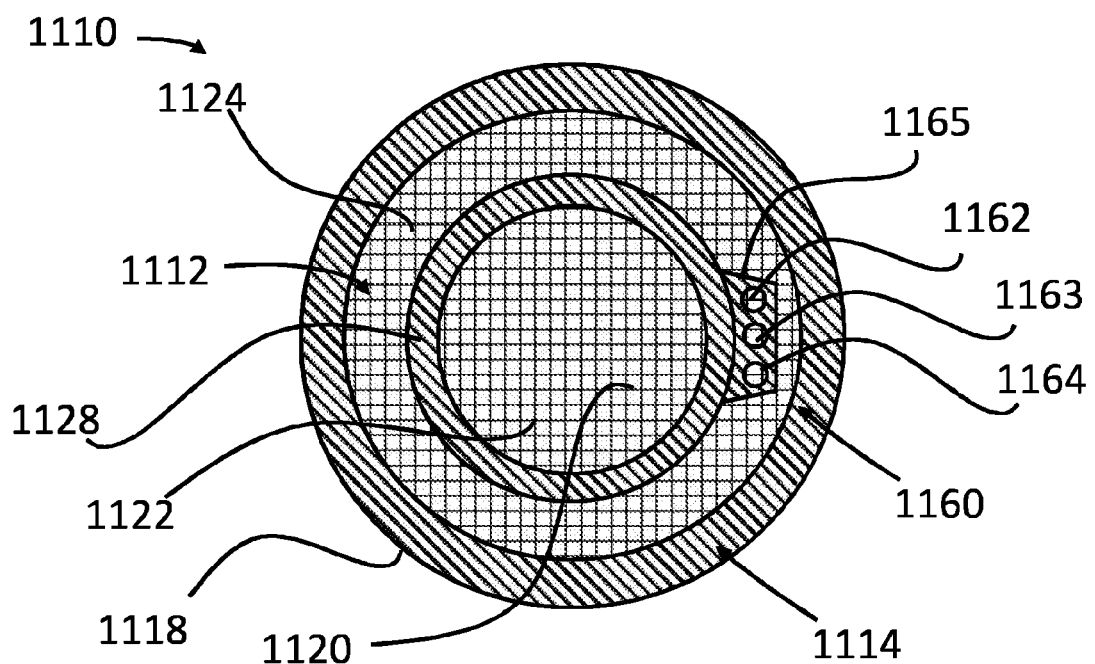
FIG. 18 is a cross-sectional axial view of the portion of the well of FIG. 17 after sealing.

Referring to FIGS. 17 and 18 there is shown a further example portion of a well 1110. The well 1110 shown in FIGS. 17 and 18 is generally similar to that shown in FIGS. 14, 15 and 16, with similar features referenced by similar reference numerals incremented by 100, not all of which are repeatedly recited in this passage of the description for brevity. Accordingly, the well 1110 comprises a bore 1112 and a swellable seal 1114.

It will be appreciated that the swellable seal 1114 of FIG. 18 has been formed using a method generally similar to that for FIGS. 14 and 16, as described above.

Here, the method comprised actively swelling the swellable such as to form the seal 1114, using an activating fluid. Here, the method comprised actively swelling the swellable by introducing or injecting the activating fluid from uphole, such as from surface or a wellhead (not shown). It will be appreciated that one or more of the conduits 1162, 1163, 1164 can be used for supplying the activating fluid downhole. In some examples, the swellable is actively swelled prior to retrieval of an advance seal, whilst in other examples the swellable is actively swollen following removal of an advance seal—and in some cases following an application of a cementing operation (e.g. to provide a cement layer on top of the swellable).

Figure 19A:
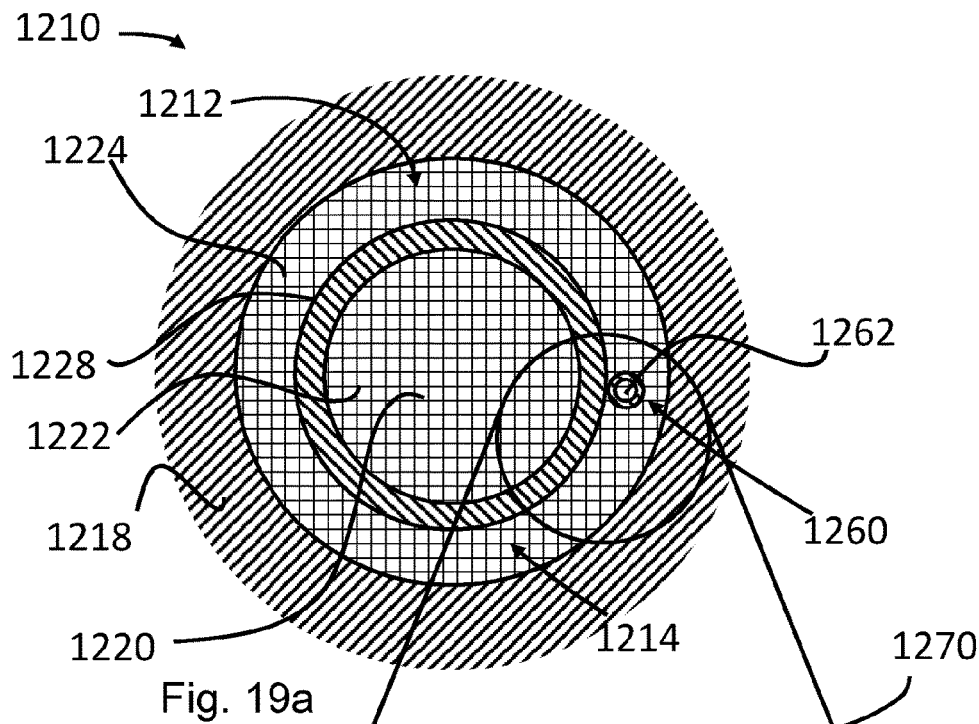
FIG. 19a is a cross-sectional axial view of a portion of a well in accordance with a further example.
Figure 19B:
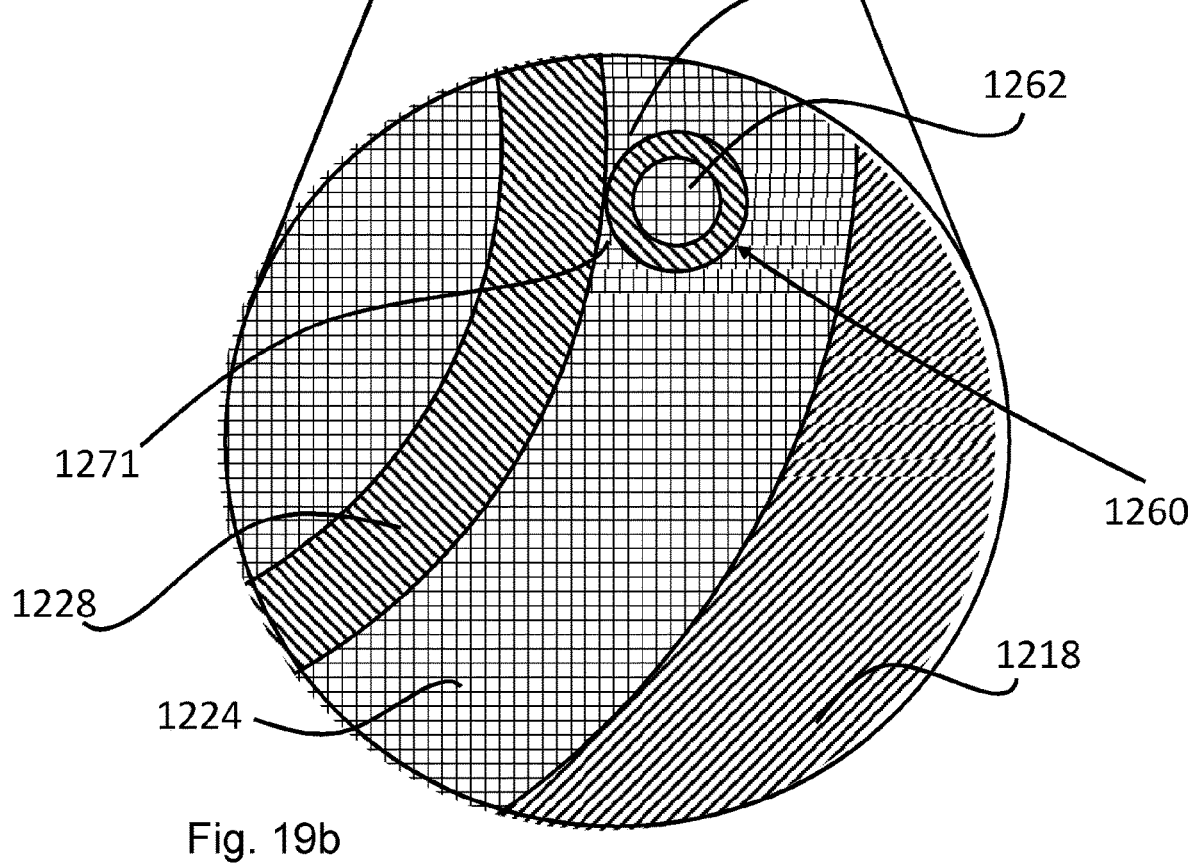

Referring to FIGS. 19a and 19b there is shown a further example portion of a well 1210. The well 1210 shown in FIGS. 19a and 19b is generally similar to that shown in FIGS. 17 and 18, with similar features referenced by similar reference numerals incremented by 100, not all of which are repeatedly recited in this passage of the description for brevity. Accordingly, the well 1210 comprises a bore 1212 and a swellable seal 1214.

It will be appreciated that the swellable seal 1214 of FIGS. 19a and 19b has been formed using a method generally similar to that for FIG. 18, as described above.

Here, the method comprises providing a swellable seal 1214 that is swellable post-curing such as to be swellable to be self-sealing (e.g. to fill cracks, microannuli, or voids after complete curing). The method comprises the provision of swellable particles sized and proportioned so as to penetrate cracks and microannuli or other potential flowpaths for fluid, such as hydrocarbon fluid. The method here comprises providing a range of sizes of swellable. Here, the method comprises the provision of particles with at least a portion with a radius less than 0.1 mm; and with a maximum diameter less than 0.2 mm. As can be seen from the detailed view of FIG. 19b, the swellable particles as configured to penetrate into such small recesses that may otherwise provide a leakpath, such as by resiliently swelling into volumes 1270, 1271 otherwise suitable for hydrocarbon fluid passage or migration.

Figure 20:
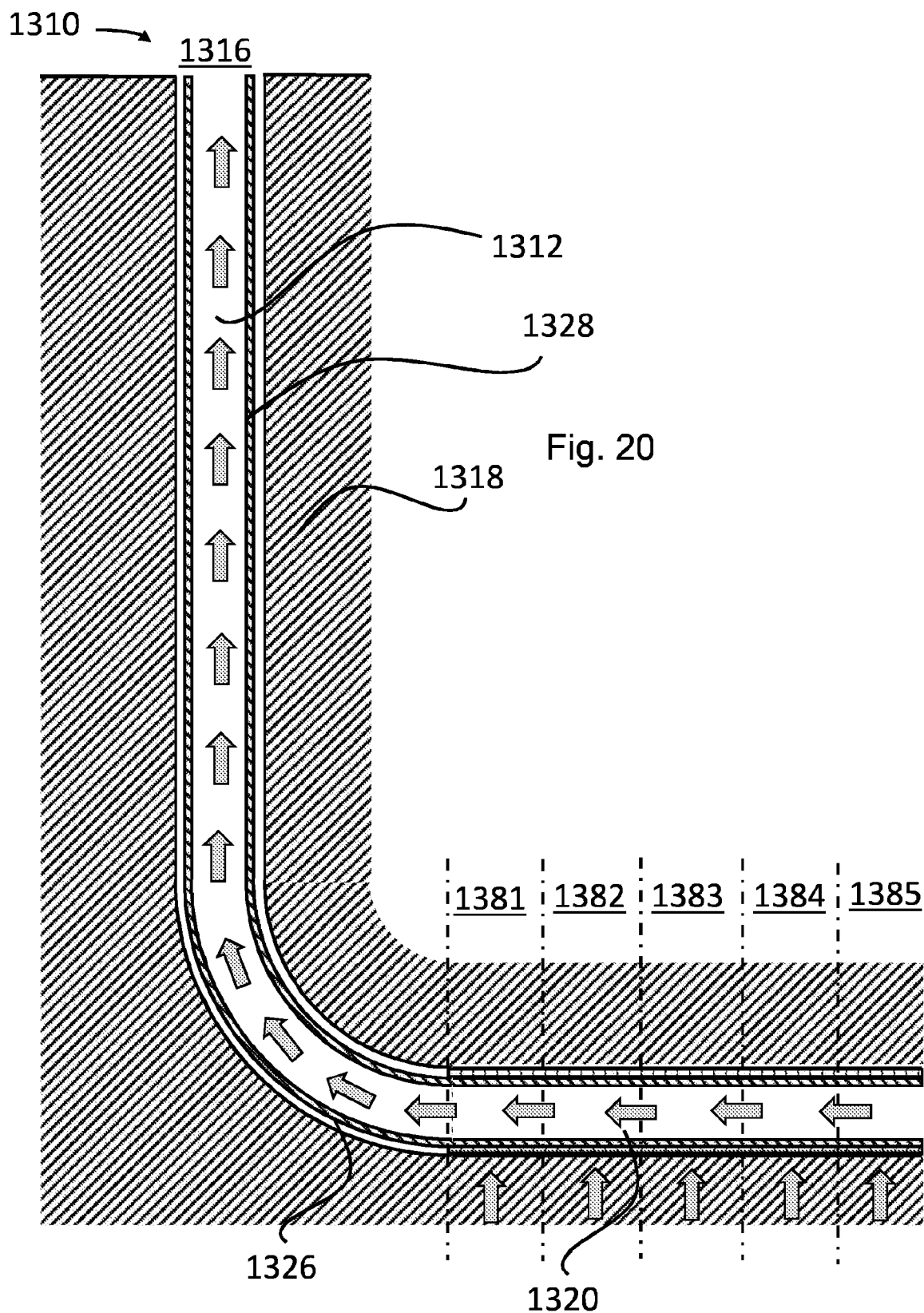
FIG. 20 is a sectional side view of a portion of a well in accordance with a further example during a first phase of production.
Figure 21:
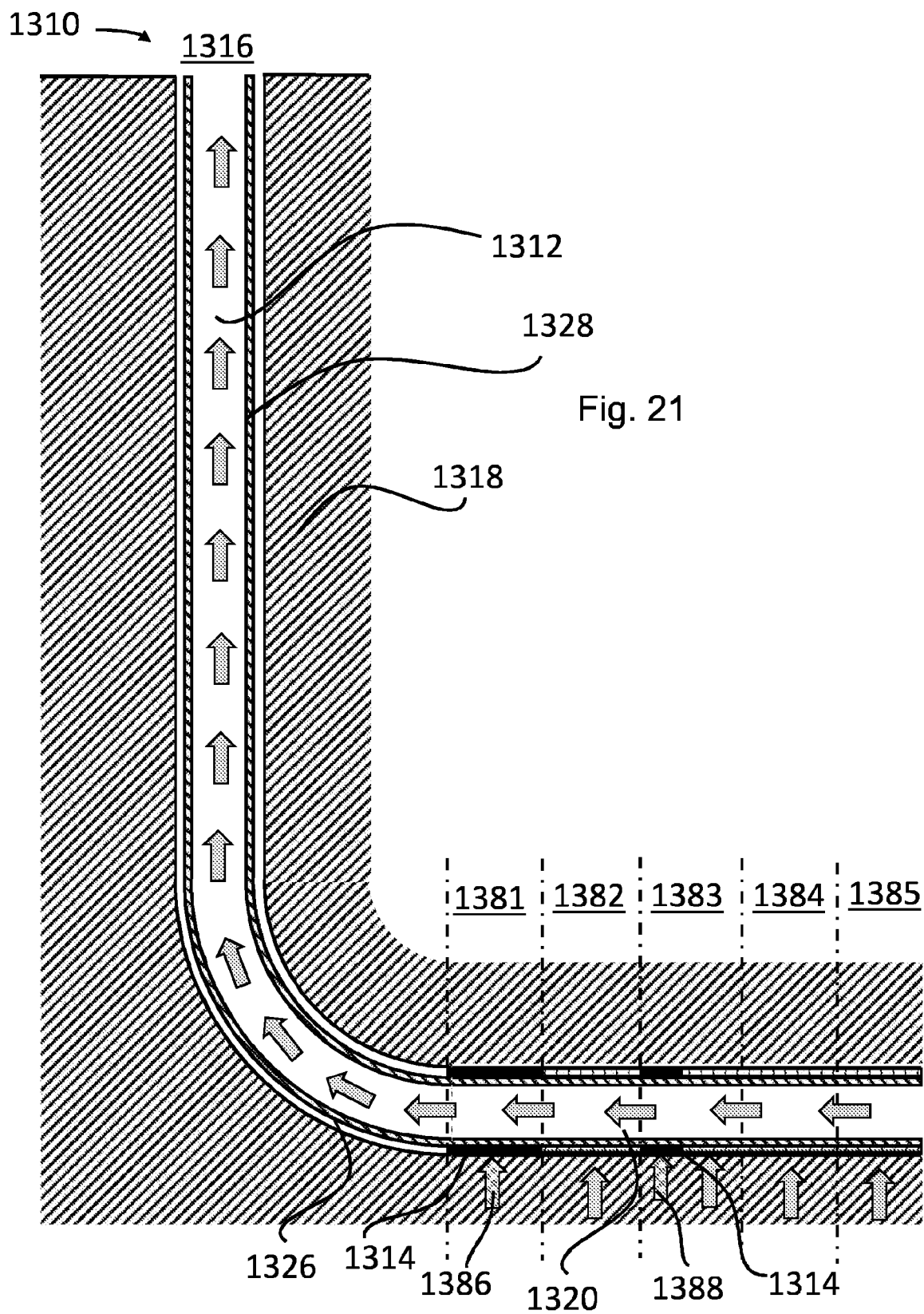
FIG. 21 is a sectional side view of the portion of the well of FIG. 20 during a second phase of production.

Referring to FIGS. 20 and 21 there is shown a further example portion of a well 1310. The well 1310 shown in FIGS. 20 and 21 is generally similar to that shown in FIGS. 19a and 19b, with similar features referenced by similar reference numerals incremented by 100, not all of which are repeatedly recited in this passage of the description for brevity. Accordingly, the well 1310 comprises a bore 1312 and a swellable seal 1314.

It will be appreciated that the swellable seal 1314 of FIGS. 20 and 21 has been formed using a method generally similar to that for FIGS. 19a and 19b, as described above.

Here, the seal 1314 helps prevent the flow of fluids laterally into and out of the bore 1312. The method comprises automatically sealing a portion of a bore 1312 to inhibit lateral flow of fluid into and out of the portion of bore 1312 whilst allowing fluid flow longitudinally through the portion of bore 1312. Here, the method comprises sealing a water-producing portion of a hydrocarbon bore 1312, by annularly sealing around a passage, here a central passage, of the bore 1312 to allow fluid to flow longitudinally in the passage of the bore 1312 through the sealed portion. The method comprises providing the swellable as an alternative or addition to water-production control, such as to provide an alternative or replace an inflow control device (not shown). The swellable is provided so as to provide an automatic seal 1314 against water-production 1386, 1388 at any localised areas of water production. Accordingly the method allows the continued hydrocarbon production from a water-producing payzone 1383 where only a portion of that payzone 1383 is producing water, as shown in FIG. 21. In comparison or contrast to compartmentalised payzones 1381, 1382, 1383, 1384, 1385, such as separated by flow control devices, controllable screens, or the like, here the method provides a water-production control system that is automatically self-adjusting continuously along its length, covering all of the payzones 1381, 1382, 1383, 1384, 1385 in this example. The swellable is provided permanently during production, having been installed at or prior to the commencement of production—here forming part of the completed cased well 1310.

Here, the swellable is applied without providing a seal until activated. For example, the applied swellable allows flow therethrough of hydrocarbons from the payzones 1381, 1382, 1383, 1384, 1385. The applied swellable only provides a seal 1314 upon activation by the presence of water. Accordingly the applied swellable only provides a seal 1314 where water 1386, 1388 is actually produced, such as in payzone 1381 and part of payzone 1383.

The method comprises applying the swellable prior to production from the well. For example, the method comprises applying the swellable during the completion of the well. Here, the swellable was applied to the annulus 1326 the bore 1312. The method comprised applying the swellable in particulate form to the annulus 1326. The method comprised creating the annulus 1326, by running in casing 1328, and supplying the swellable down the annulus 1326 from the wellhead 1316, in a circulation, with a carrier pumping down the annulus and returning via the central passage of the casing 1328. The method comprised applying the swellable to a retaining screen (not shown).

In other examples (not shown), the swellable is provided after commencement of production, such as during an intervention or remediation. For example, where a well starts producing water unexpectedly or in a location otherwise poorly-equipped to deal with water production, the swellable is applied—in particulate form—to the location. The swellable is applied by the removal of a portion of casing, liner or other tubular member and replacement with a screen, filter or other member for retaining the particulate swellable, with the particulate swellable being applied to the filter, screen or other retaining member. The method comprises providing the filter, screen or other retaining member to the location such as to allow the entrapment of the particulate swellable against the filter, screen or other retaining member. In at least some examples, the method comprises running in the filter, screen or other retaining member to the location, securing the filter, screen or other retaining member in the location and applying the particulate swellable to an annulus defined by the filter, screen or other retaining member (similar to the annulus 1326 shown in FIGS. 20 and 21). The annulus defined by the filter, screen or other retaining member is an external annulus, such as between the filter, screen or other retaining member and the bore wall or (other) casing/liner. In other examples, the annulus defined by the filter, screen or other retaining member comprises an internal annulus, such as within the filter, screen or other retaining member. In such examples, a further member is supplied, such as a further filter, screen or other retaining member or a tubular member, in order to provide an internal longitudinal passage within the swellable seal located within the filter, screen or other retaining member. The method comprises applying the swellable so as to provide a choke facility in the well.

Figure 22:
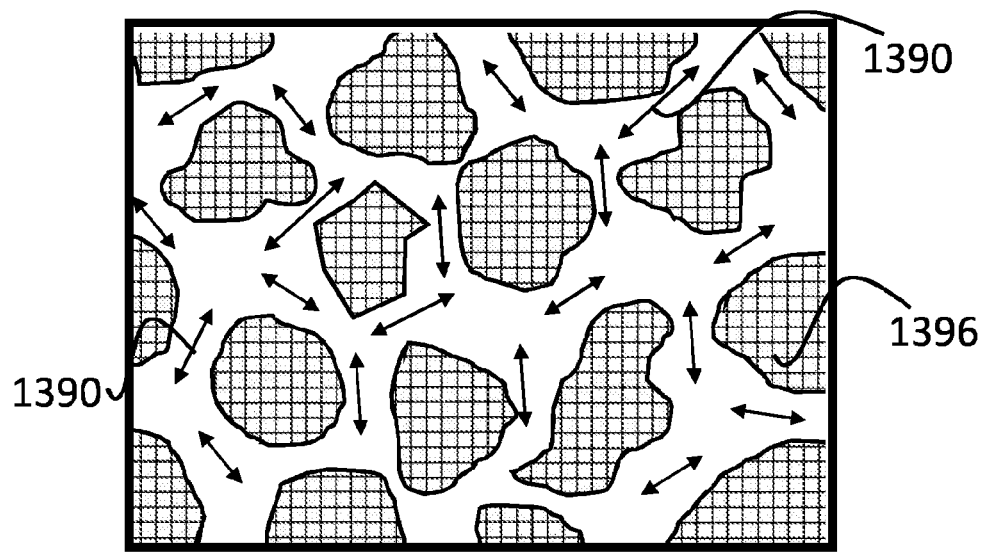
FIG. 22 is a schematic view of a portion of an example swellable prior to activation.
Figure 23:
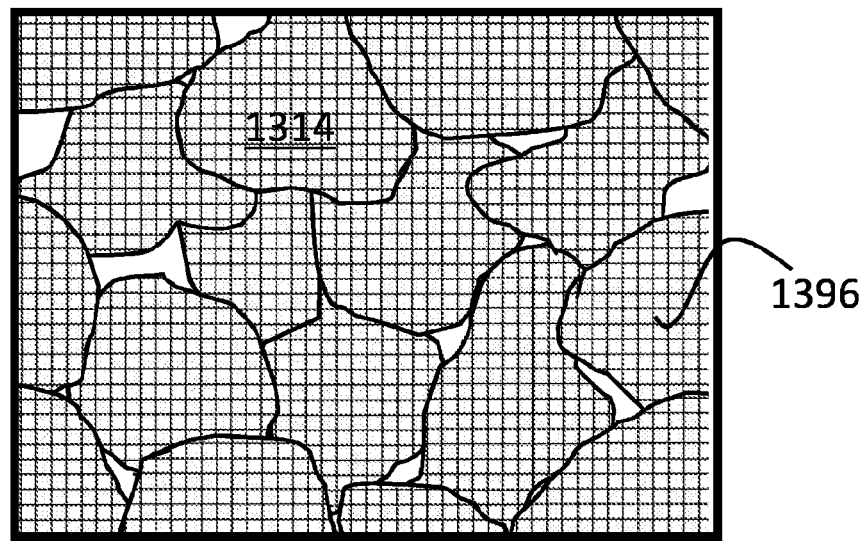
FIG. 23 is a schematic view of the portion of the swellable of FIG. 22 after activation.

FIG. 22 is a schematic view of a portion of an example swellable prior to activation, such as shown in FIG. 20; whilst FIG. 23 is a schematic view of the portion of the swellable of FIG. 22 after activation, such as shown in the water-producing payzone 1381 of FIG. 21.

As can be seen in FIG. 21, the unswollen swellable particles allow the free movement of fluid in passages 1390 between the particles. Upon contact with the activating fluid, which is water in this example, the swellable particles swell three-dimensionally so as to press against each other, thereby closing the fluid passages 1390, as shown in FIG. 23. Accordingly, the seal 1314 of FIG. 21 is activated in areas of water contact with the swellable to seal against water production into the bore 1312.

Although not shown here, at least some example methods comprise coating the particulate swellable. For example, the method comprises coating the swellable particles with a coating to inhibit or delay swelling. The coating is configured to allow the application of the swellable without activation of the swellable. The coating may assist in the application of the swellable with and/or into an activating fluid. For example, where the swellable is an oil-swellable, the swellable particles is coated so as to prevent initial swelling such as to allow the swellable to be injected by pumping with an oil-based carrier fluid. The coating may enable a delay or timing management of the activation of the swellable. The coating is an adaptable coating, such as to be mechanically and/or thermally and/or chemically adapted, such as by or during the application process—or a subsequent process (such as by flushing with an agent to act on the coating). The coating is adaptable so as to be at least partially removed from the swellable particles and/or so as to be at least partially activatable so as to set or mechanically join or bond with the coating portion/s of other coated swellable particles and/or the swellable. In at least some examples, the coating is adaptable so as to set to form a matrix to hold the swellable particles in place.

In at least some examples, the coating and/or swellable comprises a resistance to one or more of: chemicals; hydrogen sulphide; acid; high temperature hydrocarbons; high pressure hydrocarbons; temperatures up to 500 F, 650 F, respectively; pressures up to 18,000 psi; temperatures below freezing, such as down to −60 C.

Figure 24:
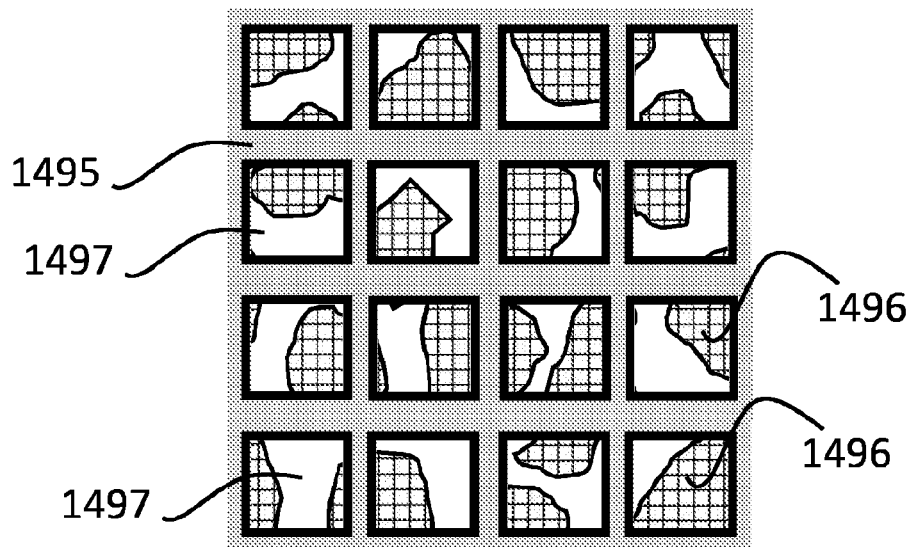
FIG. 24 is a schematic view of a portion of an example screen retaining an example swellable.
Figure 25:
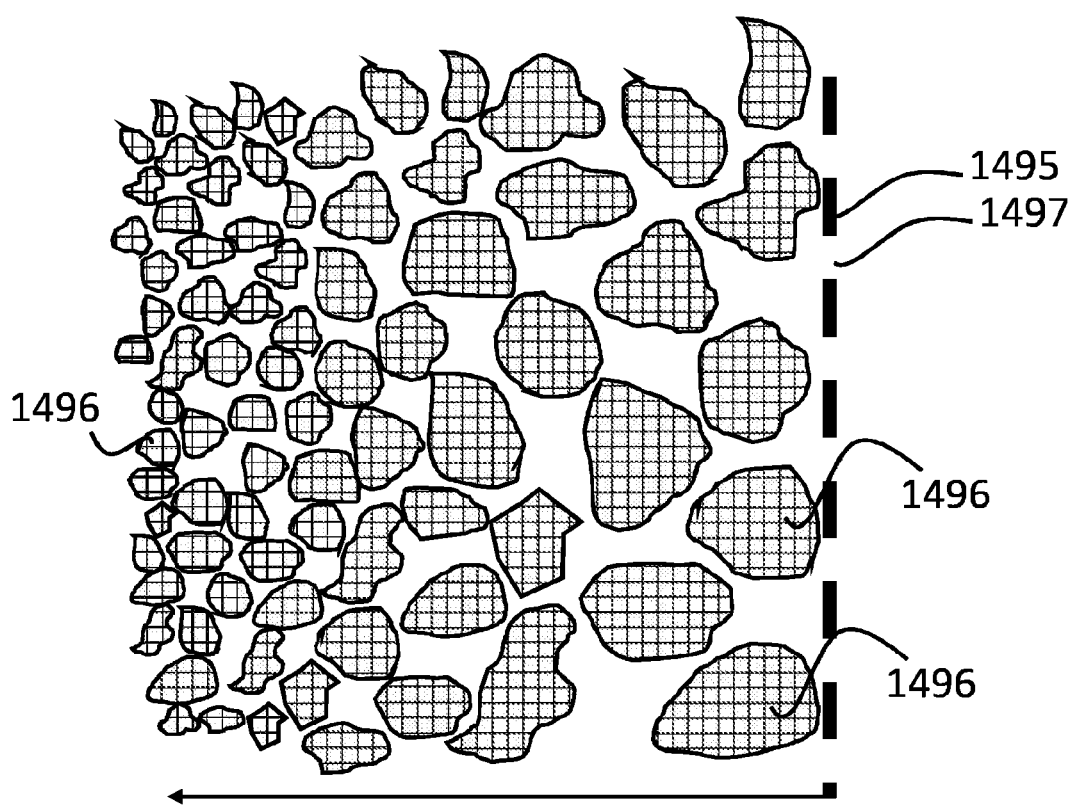
FIG. 25 is a schematic side view of the portion of the screen and swellable of FIG. 24.

FIG. 24 is a schematic view of a portion of an example screen 1495 retaining an example swellable 1496, with FIG. 25 being a schematic side view of the portion of the screen 1495 and swellable 1496 of FIG. 24.

The screen 1495 is configured with openings 1497 providing an appropriate mesh size to allow the passage of a swellable carrier fluid therethrough, whilst retaining the particles of swellable 1496. Accordingly, the screen 1495 facilitates a build-up of swellable 1496 behind the screen 1495, when a fluid carrying the swellable 1496 is pumped through the screen (pumped through left to right as depicted in FIG. 25).

The method comprises the provision of particles with at least a portion with a radius respectively less than 10 mm; less than 5 mm; less than 2 mm; less than 1 mm; less than 0.1 mm; less than 0.01 mm. In at least some example methods, the swellable comprises a diameter less respectively less than 10 mm; less than 5 mm; less than 2 mm; less than 1 mm; less than 0.1 mm; less than 0.01 mm (or doubles thereof). Here, the diameter comprises a nominal diameter.

As shown in FIG. 25, the method comprises providing a range of sizes of swellable. Here, large swellable particles are provided first, for retention by an appropriate mesh size of the screen 1495. Thereafter smaller particles of swellable 1496 are successively retained by the preceding swellable particles. The smaller particles of swellable 1496 provide an increased three-dimensional saturation so as to provide an improved seal upon swelling.

Here, the method comprises a selection of an optimum swellable characteristic/s. The optimum swellable characteristic/s comprises one or more of: swellable particle size; swellable chemical composition; swellable particle shape; swellable activation fluid (e.g. oil-based and/or water-based); chemical resistivity; thermal resistivity or combinations hereof, such as mixture/s of particle sizes and/or particle shapes. The method comprises performing the selection with the aid of calculation and/or simulation; such as a simulation based upon a model of one or more bore characteristics.

Here, the method comprises the use, reuse or recycling of components or materials. For example, the method comprises the use, reuse or recycling of swellable components or materials, by using leftover production materials, such as from the production processes for: swellable packers; gaskets or other pre-formed swellable products. The method comprises the reuse of excess or waste material from the production of other prefabricated swellable product/s. The method comprises the pre-processing or pre-treatment of such material prior to application into the bore. For example, at least some example methods comprise the refinement or granulisation of the material, such as to provide particles, pellets, fibers or granules of a predetermined size and/or shape for application into the bore. The method comprises conditioning the particulate swellable. The method comprises one or more of: categorisation; separation; adaption of the swellable particulates to provide swellable particulates of a particular size/s and or shape/s.

FIGS. 26a, 26b, 26c, 26d, 26e, 26f show sequentially schematic views of a portion of an example well 1510 with a swellable 1596 being progressively applied. Here the particles of swellable 1596 are applied downhole, being carried through openings or apertures 1597 in the casing 1528. As can be seen from particularly FIG. 26c onwards, the method comprises penetrating into the formation with the swellable 1596. The swellable 1596 is applied into the formation, as shown here, into formation/reservoir rock pore spaces 1599 within the formation rocks 1598. The method comprises clogging potential leakpaths to/from the formation with suitably sized swellable particles, which are sufficiently small to penetrate into the formation pores 1599, at least when unswollen. As shown here, the method comprises clogging potential leakpaths, such as the formation pores 1599, with the swellable 1596 comprising a range of particle sizes. As shown here, the particles can penetrate further into the formation by the swelling of the particles such that the swellable 1596 forms a (swollen) swellable seal 1514 as shown in FIG. 26f. It will be appreciated that the particular swellable seal 1514 shown in FIG. 26f blocks the passage of fluid laterally into and out of the casing 1528 and also longitudinally along the casing 1528: both within the casing 1528 and along an exterior of the casing 1528 in an adjacent annulus between the formation and casing 1528, or longitudinally within the adjacent formation.

Figure 27:
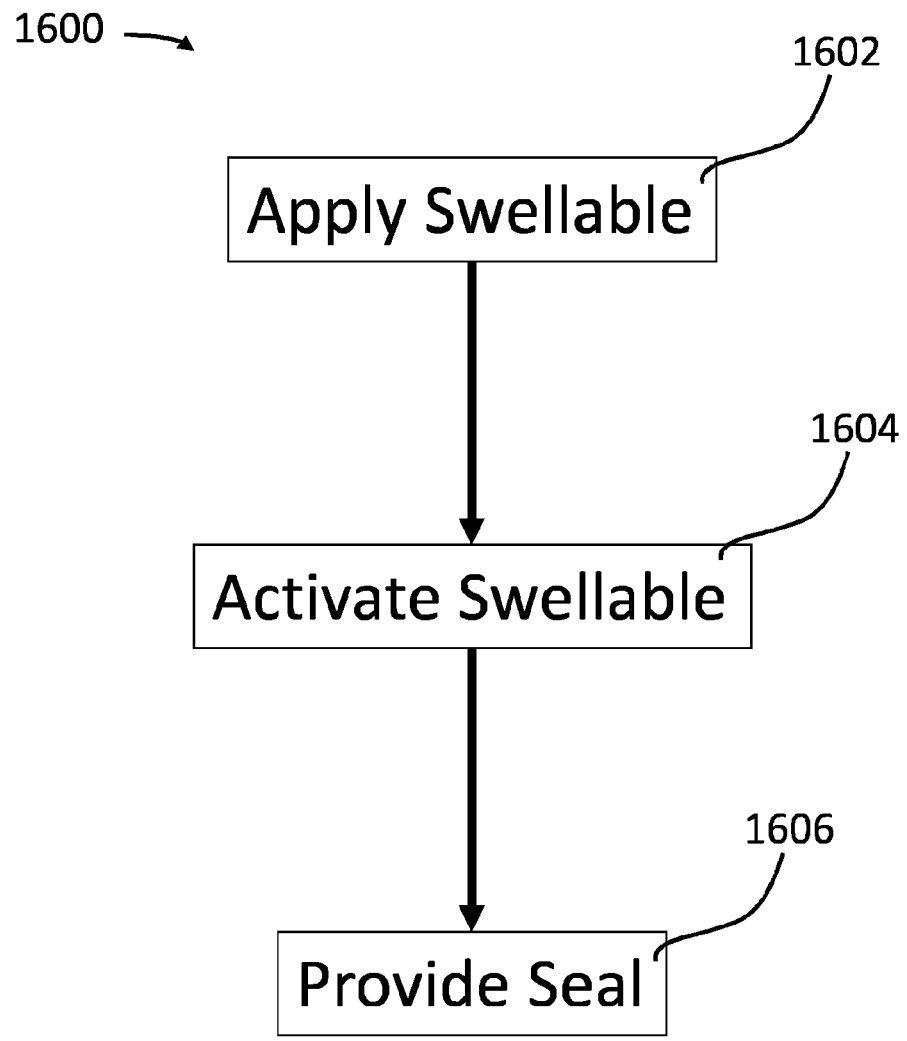
FIG. 27 is an example flow chart of an example method.

FIG. 27 shows an example flow chart of an example method. The method comprises a first step 1602 of applying a swellable; a second step 1604 of swelling the swellable so as to provide a seal in a third step 1606.

It will be appreciated that any of the aforementioned device may have other functions in addition to the mentioned functions, and that these functions may be performed by the same device.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims.

The applicant indicates that aspects of the present disclosure may consist of any such individual feature or combination of features. It should be understood that the embodiments described herein are merely exemplary and that various modifications may be made thereto without departing from the scope of the disclosure. For example, it will be appreciated that although shown here as a bore with a vertical orientation, other bores may have other orientations. For example, other example bores may have at least non-vertical portions, such as deviated or horizontal sections or bores.

It will be appreciated that example or embodiments can be realized in the form of hardware, software or a combination of hardware and software. Any such software may be stored in the form of volatile or non-volatile storage, for example a storage device like a ROM, whether erasable or rewritable or not, or in the form of memory, for example RAM, memory chips, device or integrated circuits or on an optically or magnetically readable medium, for example a CD, DVD, magnetic disk or magnetic tape or the like. It will be appreciated that the storage devices and storage media are embodiments of machine-readable storage that are suitable for storing a program or programs comprising instructions that, when executed, implement embodiments of the present disclosure.

Accordingly, examples or embodiments provide a program comprising code for implementing apparatus or a method as claimed in any one of the claims of this specification and a machine-readable storage storing such a program. Still further, such programs may be conveyed electronically via any medium, for example a communication signal carried over a wired or wireless connection and embodiments suitably encompass the same.

The invention claimed is:

1. A method of sealing in a bore for abandonment, the method comprising:
   leaving a casing or a liner downhole;
   leaving a control line downhole;
   applying a swellable in particulate form to the bore, the swellable comprising a polymer;
   positioning the particulate swellable in place within the bore at a desired location; and
   swelling the swellable so as to form a seal at the desired location, wherein the method comprises providing the seal at the downhole control line, the control line running in axial direction along a longitudinal length in the bore;
   further wherein the method comprises using the swellable to permanently seal in the liner or casing and the downhole control line during abandonment by sealing around the downhole control line, thereby preventing a leak path axially along the downhole control line.

2. The method of claim 1, wherein the particulate form comprises a granule; and wherein the method comprises applying the swellable to the bore in a non-uniform form, the swellable comprising a non-preformed pourable form prior to application.

3. The method of claim 1, comprising applying the swellable via at least a portion of one or more control lines; and further comprising supplying an activation fluid via at least a portion of one or more control lines.

4. The method of claim 1, comprising injecting the particulate swellable into the bore in a flow; wherein the flow comprises a carrier for the swellable; and wherein the carrier comprises an inert fluid.

5. The method of claim 1, comprising injecting the swellable as part of a cementing operation; and wherein the method comprises injecting the cement and the swellable simultaneously.

6. The method of claim 1, comprising injecting the cement and the swellable non-simultaneously as part of a cementing operation for abandonment, injecting the swellable sequentially with the cement, wherein the method comprises a further step of sealing, the further step comprising the cementing operation as a supplementary step subsequent to the injection of the swellable.

7. The method of claim 1, wherein the swellable is a synthetic swellable.

8. The method of claim 1, comprising applying the swellable such as to form a seal to prevent a flow of fluid longitudinally along the bore; and wherein the swellable seal comprises a length of at least 1 metre.

9. The method of claim 1, wherein the seal prevents or assists in preventing the flow of fluids laterally into and out of the bore.

10. The method of claim 1, comprising applying a plurality of axial layers of swellable; wherein different layers comprise different swellables.

11. The method of claim 1, comprising providing the swellable in a container for injection into the bore, the container comprising an outlet for flowing the swellable out of the container into the bore.

12. The method of claim 1, comprising plugging and abandoning the bore; wherein the method comprises applying the swellable after the completion of the bore and after termination of production from the bore; wherein the method comprises penetrating into a formation with the swellable; and wherein the method provides an alternative to the removal of at least sections of control line during abandonment.

13. The method of claim 1, wherein the seal comprises a seal configured to swell in the presence of both oil and water so as to re-seal or increase sealing in a subsequent presence of oil and/or water.

14. The method of claim 1, comprising actively swelling the swellable to seal with an activating fluid by injecting the activating fluid.

15. The method of claim 1, comprising providing swellable particles with at least a portion with a radius less than 10 mm; and further comprising providing a range of sizes of swellable particles.

16. The method of claim 1, comprising a step with or prior to the application of the swellable so as to provide an advance seal, the advance seal being for stemming flow or pressure whilst the applied swellable forms the swellable seal.

17. The method of claim 1, comprising a preparatory operation prior to the application of the swellable, the preparatory operation comprising increasing a receptiveness of at least a portion of the bore to the swellable.

18. The method of claim 1, comprising a use, reuse or recycling of swellable components or materials, as the swellable components or materials comprising leftover, excess or waste production materials from a production process for at least one of: swellable packers; gaskets and other pre-formed swellable products.

19. The method of claim 1, comprising repairing an intermediate section, the completed swellable seal providing an annular seal to inhibit lateral flow of fluid into and/or out of the intermediate section of the bore whilst allowing fluid flow longitudinally through the intermediate section of bore; and further comprising providing the swellable as an alternative or addition to water-production control, and the method allows the continued hydrocarbon production from a water-producing payzone where only a portion of that payzone is producing water.

* * * * *